(12) United States Patent
Danner

(10) Patent No.: US 9,057,888 B2
(45) Date of Patent: Jun. 16, 2015

(54) FABRIC SUNSHADE

(76) Inventor: John Adam Danner, Tampa, FL (US)

( * ) Notice: Subject to any disclaimer, the term of this patent is extended or adjusted under 35 U.S.C. 154(b) by 357 days.

(21) Appl. No.: 13/493,401

(22) Filed: Jun. 11, 2012

(65) Prior Publication Data

US 2013/0180029 A1 Jul. 18, 2013

Related U.S. Application Data

(63) Continuation-in-part of application No. 13/348,867, filed on Jan. 12, 2012, now abandoned.

(51) Int. Cl.
*A41D 23/00* (2006.01)
*G02C 11/00* (2006.01)
*A41D 13/05* (2006.01)

(52) U.S. Cl.
CPC ............ *G02C 11/00* (2013.01); *A41D 13/0512* (2013.01)

(58) Field of Classification Search
CPC .............................. A42B 1/067; A41B 13/103
USPC ................................ 2/171, 172, 207, 202, 174
See application file for complete search history.

(56) References Cited

U.S. PATENT DOCUMENTS

| | | | | |
|---|---|---|---|---|
| 869,741 A * | 10/1907 | Seitzman | ............................ | 2/206 |
| 889,640 A * | 6/1908 | Sherman | ............................ | 2/172 |
| 986,728 A * | 3/1911 | Lee | ..................... | 2/174 |
| 1,163,287 A * | 12/1915 | Van Raalte | ......................... | 2/207 |
| 2,629,869 A * | 2/1953 | Locken | ............................... | 2/12 |
| 2,698,944 A * | 1/1955 | Ramsby | ............................ | 2/174 |
| 2,897,510 A * | 8/1959 | Forbes-Robinson | ............... | 2/172 |
| 3,540,060 A * | 11/1970 | Brown | ............................ | 2/49.2 |
| 4,133,604 A * | 1/1979 | Fuller | ............................ | 351/123 |
| 4,445,231 A * | 5/1984 | Noel | ................................. | 2/49.3 |
| 4,520,510 A * | 6/1985 | Daigle | ............................... | 2/452 |
| 4,751,746 A * | 6/1988 | Rustin | ................................. | 2/13 |
| 4,771,477 A * | 9/1988 | Cahill | ................................. | 2/12 |
| 4,793,702 A * | 12/1988 | Ahrens et al. | ................... | 351/157 |
| 4,821,341 A | 4/1989 | Baptiste | | |
| 4,881,803 A * | 11/1989 | Giles et al. | ..................... | 351/156 |
| 4,924,527 A * | 5/1990 | Hintermeyer | ........................ | 2/46 |
| 5,046,195 A * | 9/1991 | Koritan | .............................. | 2/172 |
| 5,081,717 A | 1/1992 | Shedd et al. | | |
| 5,083,317 A * | 1/1992 | DeMoreta | .......................... | 2/174 |
| 5,153,943 A * | 10/1992 | Clement | ............................ | 2/418 |
| 5,161,259 A | 11/1992 | Shorts | | |
| 5,293,646 A * | 3/1994 | Winston | ............................... | 2/88 |
| 5,323,491 A * | 6/1994 | Barrett, Jr. | ........................ | 2/207 |
| 5,355,535 A * | 10/1994 | Bruder | ............................... | 2/172 |
| 5,400,440 A * | 3/1995 | Clifford | ............................ | 2/172 |
| 5,448,778 A * | 9/1995 | Phillips | ............................ | 2/172 |
| 5,504,941 A * | 4/1996 | Sell | ................................... | 2/49.2 |
| 5,603,120 A * | 2/1997 | Gifford | ............................. | 2/172 |

(Continued)

*Primary Examiner* — Richale Quinn
(74) *Attorney, Agent, or Firm* — Lonnie R Drayer

(57) ABSTRACT

A fabric sunshade can be used alone or may be assembled with glasses having temples. The sunshade has a first edge, an opposed second edge, and third and fourth edges that each extend between the first edge and the second edge. An opening in the sunshade is disposed nearer to the first edge than the second edge. The sunshade is symmetrical about an axis that extends from the first edge to the second edge and passes through the opening. In close proximity to each of the third and fourth edges the sunshade is provided with a fastening system that may be used to fasten a first portion of the sunshade to a second portion of the sunshade when the sunshade is folded over on itself either in a direction perpendicular to the axis of symmetry or in a direction parallel to the axis of symmetry.

20 Claims, 20 Drawing Sheets

(56) References Cited

U.S. PATENT DOCUMENTS

| | | | |
|---|---|---|---|
| 5,669,075 A | 9/1997 | Weeks | |
| 5,685,016 A * | 11/1997 | Douglas | 2/171 |
| 5,694,647 A * | 12/1997 | Crickmore | 2/172 |
| 5,701,609 A | 12/1997 | Bridges | |
| H001738 H * | 7/1998 | Reinhart, Jr. | |
| 5,822,792 A * | 10/1998 | Reinhart, Jr. | 2/49.1 |
| 5,918,311 A * | 7/1999 | Lampson et al. | 2/49.2 |
| 5,930,842 A * | 8/1999 | Burruss | 2/452 |
| 6,032,292 A * | 3/2000 | Wood et al. | 2/207 |
| 6,047,401 A * | 4/2000 | Traumer | 2/10 |
| 6,115,843 A * | 9/2000 | Travalgia | 2/171 |
| 6,209,133 B1 * | 4/2001 | Hinshaw | 2/49.1 |
| 6,247,180 B1 * | 6/2001 | Heinz | 2/171 |
| D474,327 S | 5/2003 | Giesen et al. | |
| 6,966,072 B1 * | 11/2005 | Kobayashi | 2/209.13 |
| 7,131,148 B1 * | 11/2006 | Traumer | 2/426 |
| 7,269,857 B2 * | 9/2007 | Cymbol | 2/49.2 |
| 2002/0035745 A1 | 3/2002 | Spell | |
| 2002/0069446 A1 * | 6/2002 | Pinckney et al. | 2/49.1 |
| 2006/0212995 A1 | 9/2006 | Collins | |

* cited by examiner

FABRIC SUNSHADE

This is a Continuation-in Part of application Ser. No. 13/348,867 filed Jan. 12, 2012.

FIELD OF THE INVENTION

The present invention relates to a fabric sunshade that may be used to shield a portion of a wearer from the sun either by itself when assembled with glasses.

BACKGROUND OF THE INVENTION

Persons exposed to sunlight should attempt to reduce the exposure of skin on the back of the neck and ears to ultraviolet rays that may cause dry skin or, in extreme cases, skin cancer. Often persons exposed to sunlight employ glasses with darkened lenses to aid in protecting their eyes from ultraviolet rays. Persons have addressed these problems in the past by wearing hats with broad brims or wearing hats provided with fabric sunshades. Many persons do not like to wear hats, or prefer stocking style hats or to tie a bandana on their head. These persons however still need to protect their neck and ears from ultraviolet rays, and a means for doing this is provided by the present invention which entails a fabric sunshade that may be secured to a person's head using glasses.

DISCUSSION OF THE PRIOR ART

One way to protect eyes from direct sunlight is a simple sun visor such as that taught in U.S. Pat. No. 2,629,869. Another way to shade the ears and neck of a person is by wearing a hat with a large brim that is at least semi-rigid such as that taught in U.S. Pat. No. 4,771,477.

Another way to protect a person's ears and neck from direct sunlight is to wear a cap or hat that is provided with a fabric sunshade attached to or integral with the cap or hat as taught for example in: U.S. Pat. No. 2,897,510; U.S. Pat. No. 5,081,717; U.S. Pat. No. 5,083,317; U.S. Pat. No. 5,400,4440; U.S. Pat. No. 5,694,647; U.S. Pat. No. 5,153,043; U.S. Pat. No. 5,161,259; U.S. Pat. No. 5,355,535; U.S. Pat. No. 5,448,778; U.S. Pat. No. 5,669,075; U.S. Pat. No. 5,701,609; U.S. Pat. No. 6,966,072; US 2002/0035745 A1; U.S. Pat. No. D 474,327; and the "Universal Sun Shade" disclosed at http://www.amazon.com/Dr-Shade-Universal-Sun/dp/B0045E5XE0.

Another way to shade the ears and neck of a person is by wearing a headband that extends completely around the head with a fabric sunshade fixed directly to the headband as taught in U.S. Pat. No. 5,046,195; U.S. Pat. No. 5,323,491; US 2006/0212995 A1; and the SolFlap™ head wrap as advertised at Solflaps.com on the internet, http://www.solflaps.com/asi.html.

U.S. Pat. No. 6,032,292 discloses a bandanna or scarf formed with holding elements thereon, and may include a number of flexible layers which provide protection from the elements. A top portion of the bandanna or scarf may include elastic elements to aid in securing the bandanna or scarf in place on the nose of a wearer, or may have a pair of drawstrings with locking elements to enable the bandanna or scarf to be adjustably tightened when wearing. The drawstrings may also include loops for supporting glasses thereon. However, the glasses are not used to support or maintain the bandanna or scarf in place on a wearer.

U.S. Pat. No. 4,821,341 discloses a size adjustable sun-visor and headpiece combination adapted to be worn on the head of a wearer, the headpiece having a front portion to run across the forehead of the wearer and a rear portion extending downwardly to cover the back of the neck of the wearer. An elongated headband is secured to opposite sides of the rear portion of the headpiece. A button is provided on each of the right side and left side portions of the headband to secure the sun-visor to the headband, the sun-visor including two elastic straps secured to opposite sides thereof to form end loops to accommodate associated ones of the buttons to attach the sun-visor to the headband while permitting the end loops to be detached from their respective buttons for removal of the sun-visor from said headband. The sun-visor may be raised or lowered at the discretion of a wearer of the device. This device is not designed for use with ordinary glasses, but rather requires a sun-visor having a specific configuration.

SUMMARY OF THE INVENTION

There is provided in accordance with a first aspect of the present invention a sunshade comprising a piece of fabric, the sunshade having a first edge, an opposed second edge, and third and fourth edges that each extend between the first edge and the second edge, the sunshade having an opening therein that is disposed nearer to the first edge than the second edge, the sunshade being symmetrical about an axis that extends from the first edge to the second edge and passes through the opening, and in close proximity to each of the third and fourth edges the sunshade is provided with a fastening system comprising fastening devices that may be used to fasten a first portion of the sunshade to a second portion of the sunshade when the sunshade is folded over on itself either in a direction perpendicular to the axis of symmetry or in a direction parallel to the axis of symmetry.

The fastening devices are located may be for example complementary male and female snaps, complementary buttons and buttonholes, complementary patches of hook and loop materials, or complementary magnetic members and ferrous members. The fastening devices are arranged such that there are complementary pairs of the fastening devices whether the sunshade is folded over on itself either in a direction perpendicular to the axis of symmetry or in a direction parallel to the axis of symmetry.

BRIEF DESCRIPTION OF THE DRAWINGS

FIG. 27 shows the unfolded sunshade of FIG. 20 being worn by a person.

DETAILED DESCRIPTION OF THE INVENTION

Figure 1:
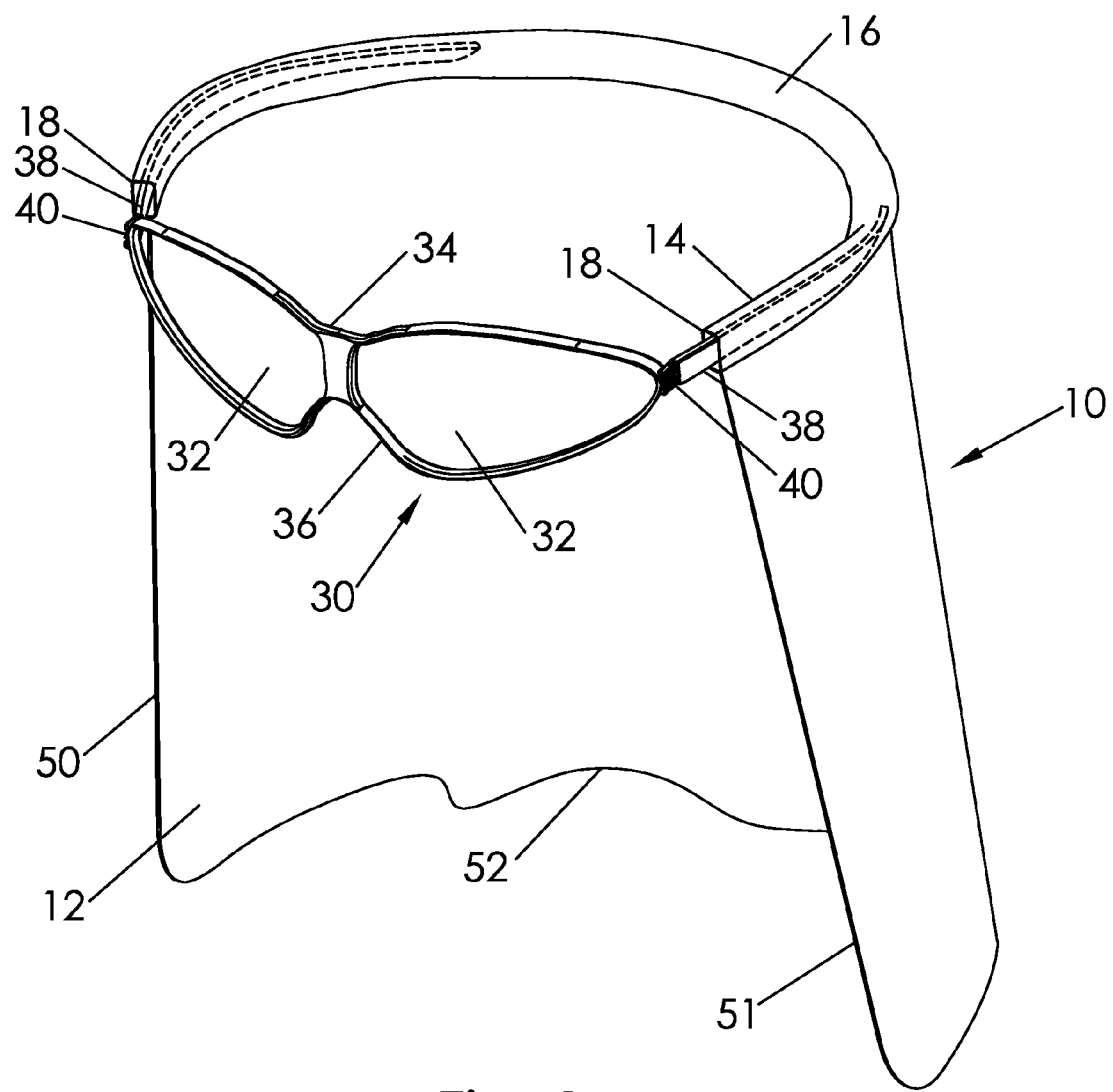
FIG. 1 is a perspective view of a first embodiment of a fabric sunshade assembled with a pair of glasses.
Figure 2:
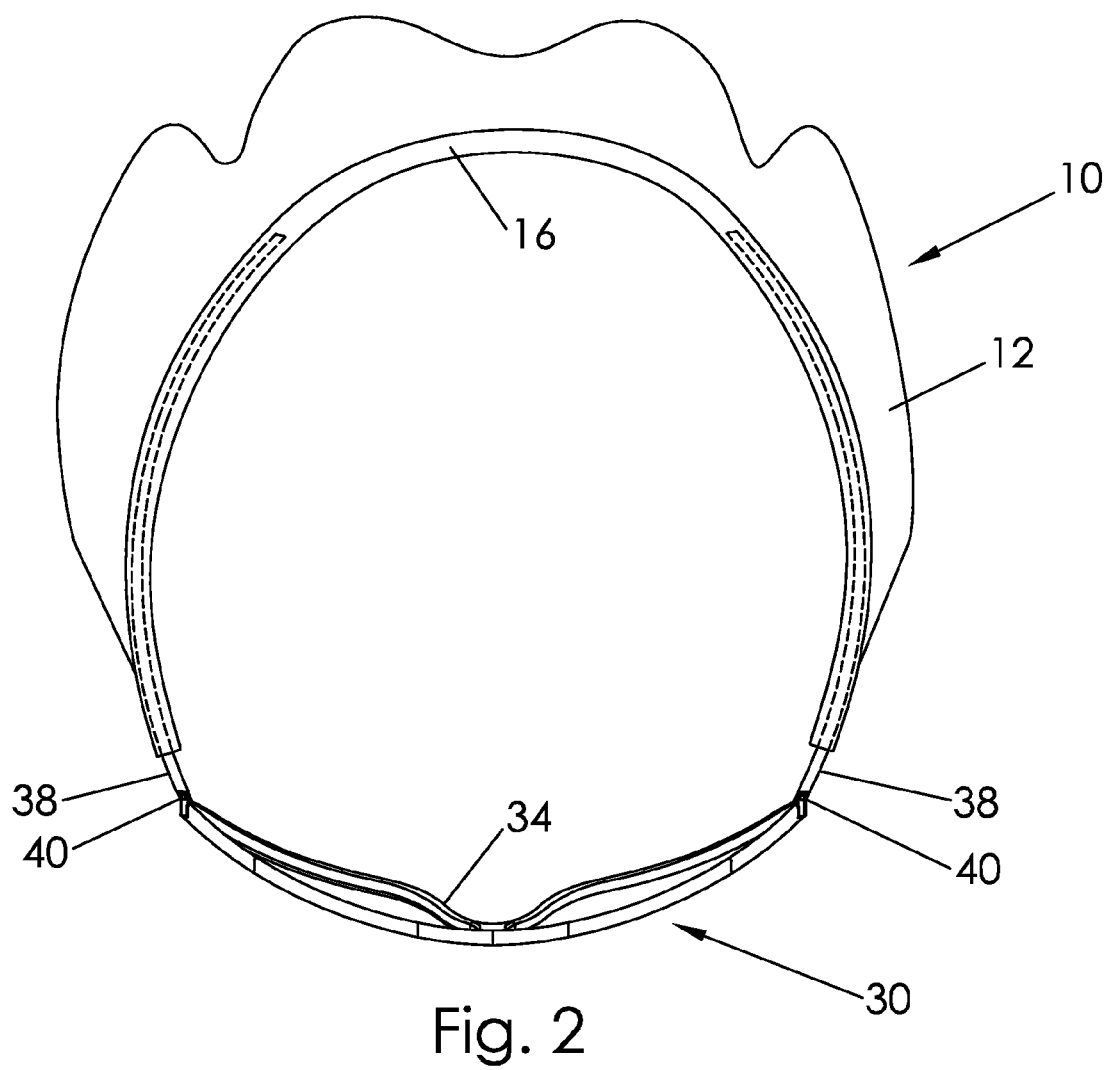
FIG. 2 is a top view looking down on the first embodiment of the fabric sunshade assembled with a pair of glasses.

Referring first to FIGS. 1 and 2 there is shown a perspective view of a first embodiment of a fabric sunshade 10 assembled with a pair of glasses 30 and a top view looking down on the same assembly. As used herein an in the claims the terms "glasses" and "pair of glasses" are understood to have their widely accepted meanings of a device to compensate for defective vision or to protect the eyes from light, dust, and the like, consisting usually of two glass or plastic lenses 32 set in a frame 34 that includes a nosepiece 36 called a bridge for resting on the bridge of the nose and two sidepieces 38 called temples that extend over and/or behind the ears to help hold the frame in place. Hinges 40 connect the front part of the frame to the temples and allows the temples to swing. As used herein and in the claims the term sunshade is understood to have the widely accepted meaning of an article that is used or worn to protect a person from the sun's rays, including at least a portion of the ultraviolet rays that art a component of sunlight. A sunshade of the present invention may be assembled with glasses having clear lenses, tinted lenses, lenses that darken when exposed to sunlight, corrective lenses, non-corrective lenses, or lenses having any combination of these features.

Figure 3:
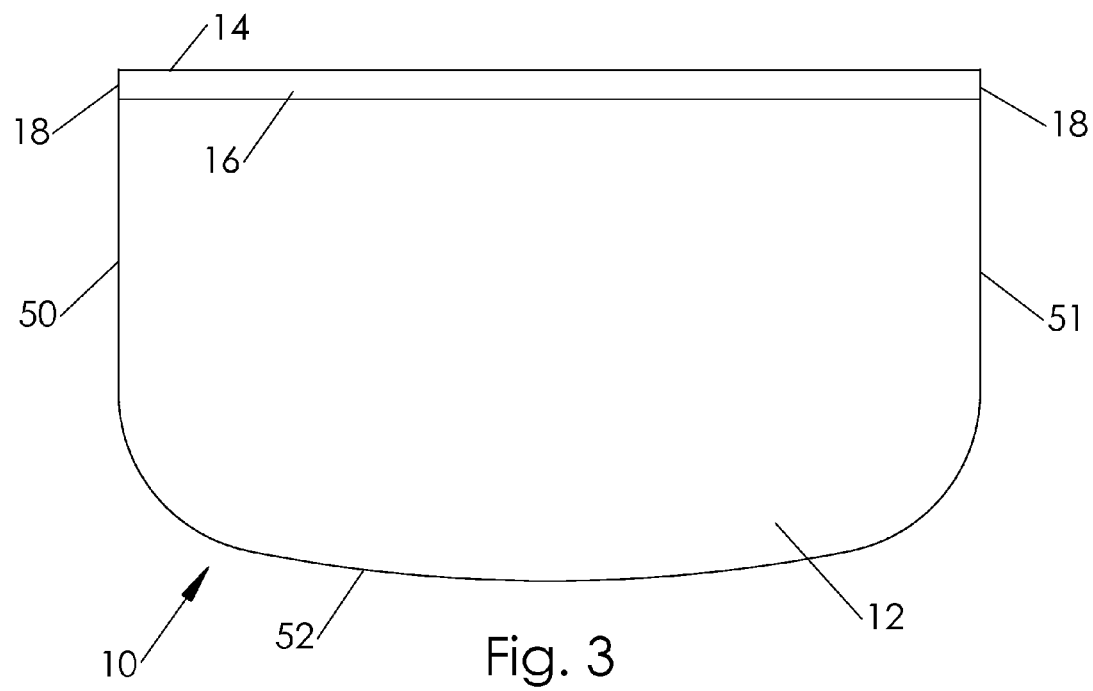
FIG. 3 is a front plan view of the first embodiment of the fabric sunshade for use with glasses.
Figure 4:
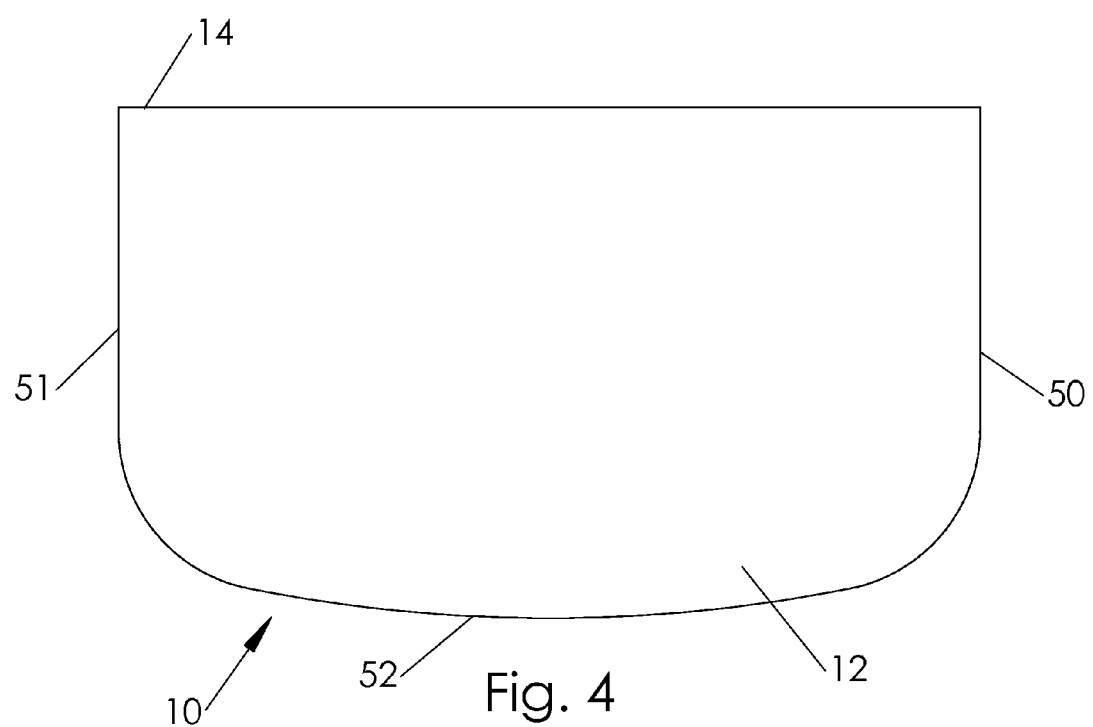
FIG. 4 is a rear plan view of the first embodiment of the fabric sunshade for use with glasses.

FIG. 3 is a front plan view and FIG. 4 is a rear plan view of the first embodiment of the fabric sunshade 10 for use with glasses. The sunshade comprises a piece of fabric 12, the sunshade has an edge 14 and is provided with at least one passageway 16 located near the edge 14 of the sunshade and extends at least substantially parallel to the edge of the sunshade. The passageway 16 has a pair of open ends 18 for receiving the temples 38 of the glasses to attach the sunshade to the glasses. As shown in FIGS. 1 and 2 sunshade extends between the temples of the glasses and when the glasses and sunshade are worn by a person the passageway extends along a back side of the head of a wearer and the sunshade extends downward to shade at least a portion of a neck of the wearer. As shown a sunshade of the present invention is designed to protect both the ears and at least a portion of the neck of a person wearing an assembly of the sunshade and glasses.

While it is contemplated that a sunshade according to each of the embodiments disclosed herein may be manufactured using any suitable fabric, whether or not it is stretchable, it is believed to be advantageous for the fabric employed in the piece of fabric of each of the embodiments disclosed herein to comprise a four-way stretch fabric. As used herein and in the claims the term four-way stretch fabric is understood to have its' widely accepted meaning of a fabric, such as spandex, that stretches in both directions, crosswise and lengthwise. Spandex is a synthetic fiber composed of a long-chain polymer used in the manufacture of garments to add elasticity. Four way stretch fabric is widely available, distributors include for example: Pine Crest Fabrics, 6015 NE 80th Avenue, Portland, Oreg. 97218, which is marketed at http://www.pinecrestfabrics.com/category/show/2; and Sportek International, Inc., 920 Gladys Avenue, Los Angeles, Calif. 90021, which is marketed at http://sportek.com/cgi-bin/index.cgi?cart_id=1324249125.31647&pid=2&back=0&category=Nylon_Spandex_Solids. It is also advantageous for the fabric employed in the piece of fabric of each of the embodiments disclosed herein to comprise a fabric designed for sun protection and rated for its level of ultraviolet (UV) protection. A special weave structure and denier (related to thread count per inch) may produce sun protective properties. In addition, some textiles and fabrics employed in the use of sun protective clothing may be pre-treated with UV inhibiting ingredients during manufacture to enhance their UV blocking capacity. An Ultraviolet Protection Factor (or "UPF") rating system measures the UV protection provided by fabric. It is very similar to the SPF rating system used for sunscreens. A garment with a UPF of 50 only allows 1/50th of the UV radiation falling on the surface of the garment to pass through it. In other words, it blocks 49/50ths or 98% of the UV radiation. Fabrics that have both four-way stretch and are designed for sun protection are commercially available, distributors include for example: Pine Crest Fabrics, 6015 NE 80th Avenue, Portland, Oreg. 97218, which is marketed at http://www.pinecrestfabrics.com/category/show/2; and Sportek International, Inc., 920 Gladys Avenue, Los Angeles, Calif. 90021, http://sportek.com/cgi-bin/index.cgi?cart_id=1324249125.31647&pid=2&back=0&category=Nylon_Spandex_Solids.

Referring again to FIGS. 3 and 4 a sunshade of each of the embodiments disclosed herein has a long edge 14 that is straight, and is located at the top of the sunshade when the sunshade is assembled with glasses. A pair of side edges 50, 51 each extends from the top edge 14 and extend substantially downward when the sunshade is assembled with glasses. A bottom edge 52 of the sunshade is preferably curvilinear and merges with the side edges 50, 51 following a curved path. The sunshade may have any dimensions desired to accommodate wearers of various sizes, but it is believed that a single size of sunshade may accommodate a majority of adults because of the stretch characteristics of the four-way stretch fabric. Elastic characteristics of the four-way stretch fabric aid in retaining the glasses in a proper position on a wearer.

Figure 5:
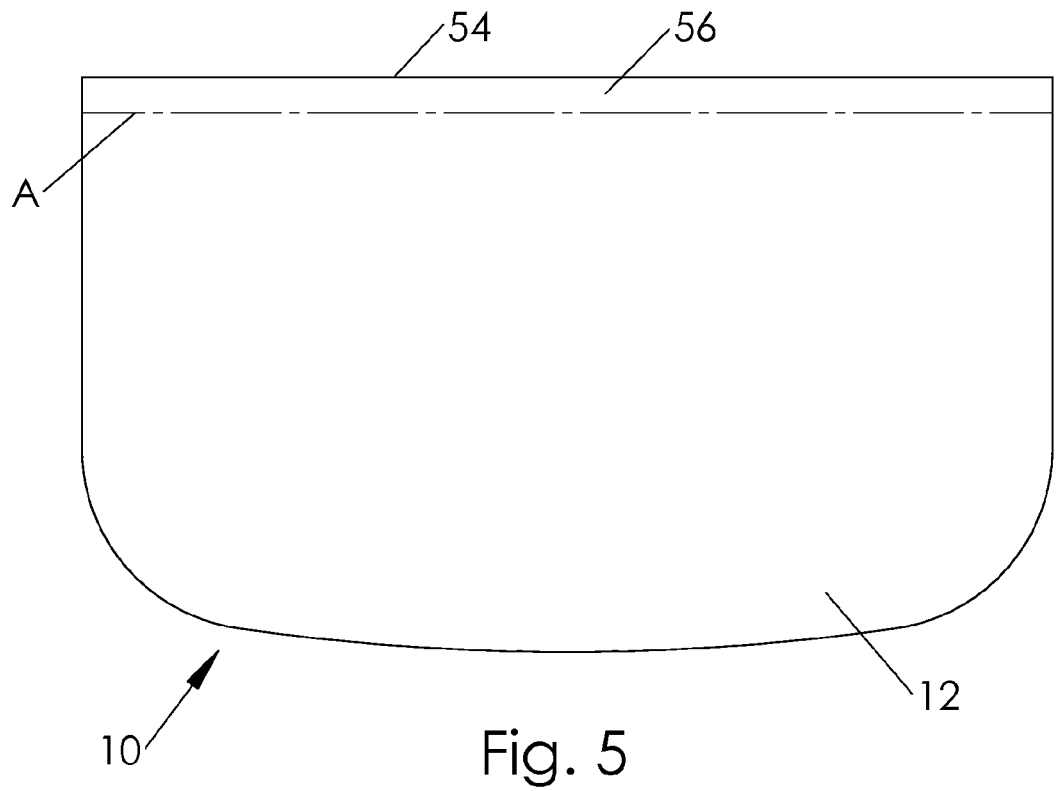
FIG. 5 is a plan view of the first embodiment of the fabric sunshade as a blank during the process of manufacturing the sunshade.
Figure 6:
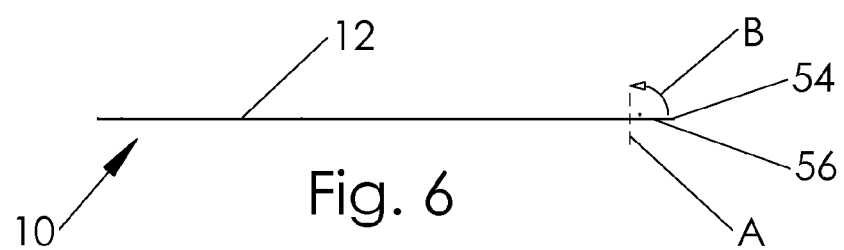
FIG. 6 is a schematic view of the first embodiment of the fabric sunshade from the side during the process of manufacturing the sunshade.
Figure 7:
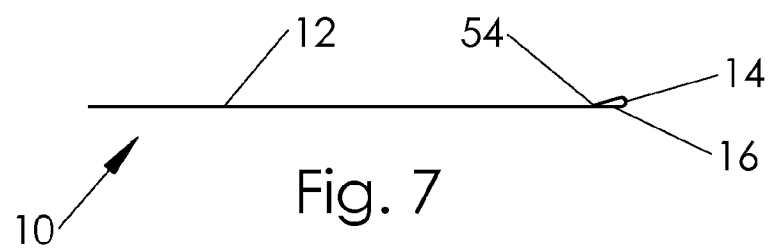
FIG. 7 is a schematic side view of the first embodiment of the completed sunshade.

Manufacture of a sunshade 10 according to the first embodiment can be better understood with reference to FIGS. 5-7 which show respectively: a plan view of the first embodiment of the fabric sunshade as a blank during the process of manufacturing the sunshade; a schematic view of the first embodiment of the fabric sunshade from the side during the manufacturing process; and a schematic side view of the first embodiment of the completed fabric sunshade. In this first embodiment a single passageway 16 extends along the edge 14 of the sunshade 10. An edge portion 56 of the piece of fabric 12 is located adjacent an edge 54 of a fabric blank. The single passageway 16 comprises a folded over edge portion 56 of the piece of fabric that is fixed to the piece of fabric to form the passageway. That is to say, the edge portion 56 is folded about a fold line A in a direction B and then fixed to a main portion of the piece of fabric by stitching, an adhesive, heat staking or any other suitable means to form the passageway 16 which is open at both ends to accommodate the temples of a pair of glasses. Elastic characteristics of the four-way stretch fabric cause the fabric to grip the temples and aid in securing the sunshade to the glasses.

Figure 8:
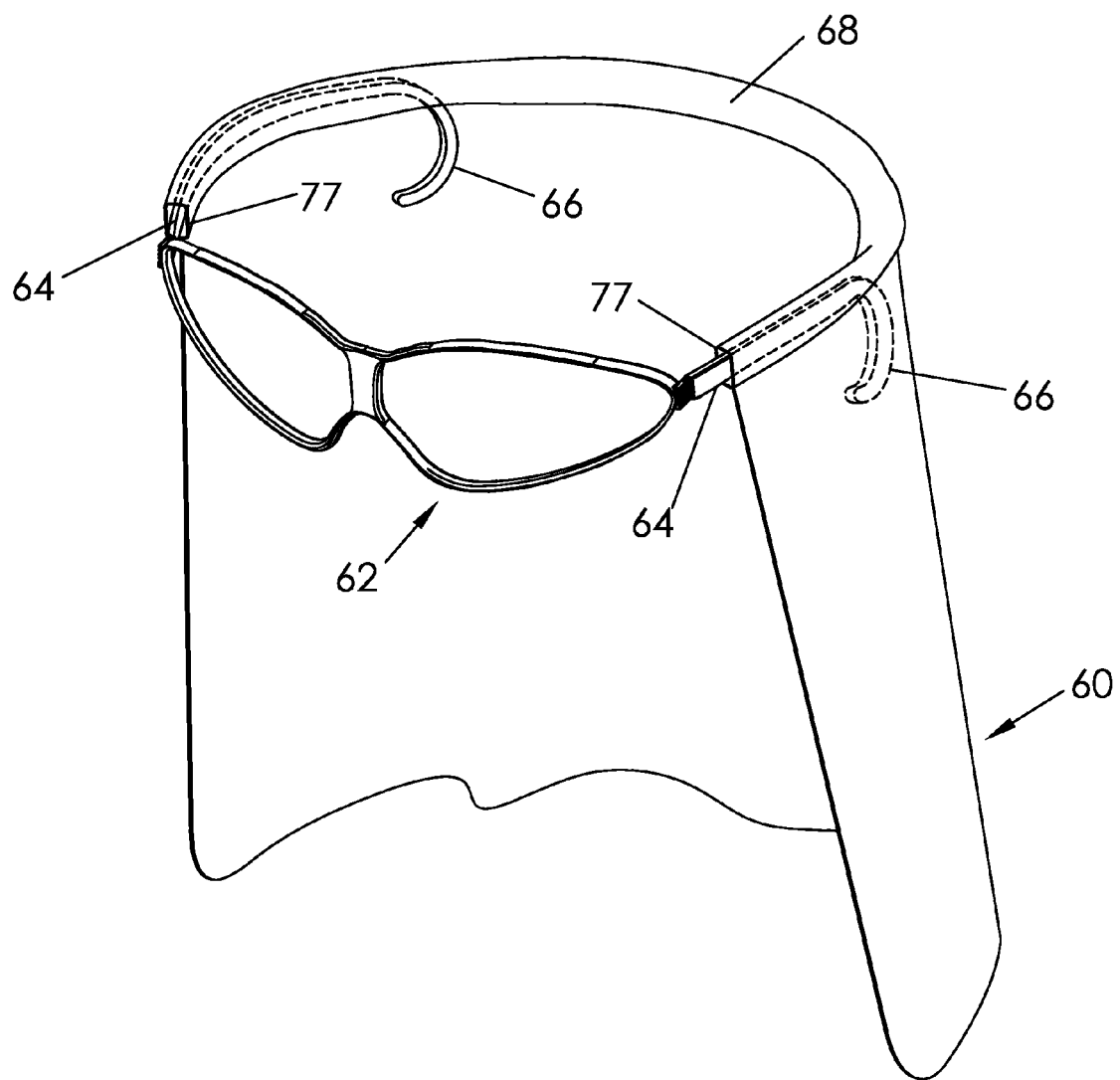
FIG. 8 is a perspective view of a second embodiment of a fabric sunshade assembled with a pair of glasses.
Figure 9:
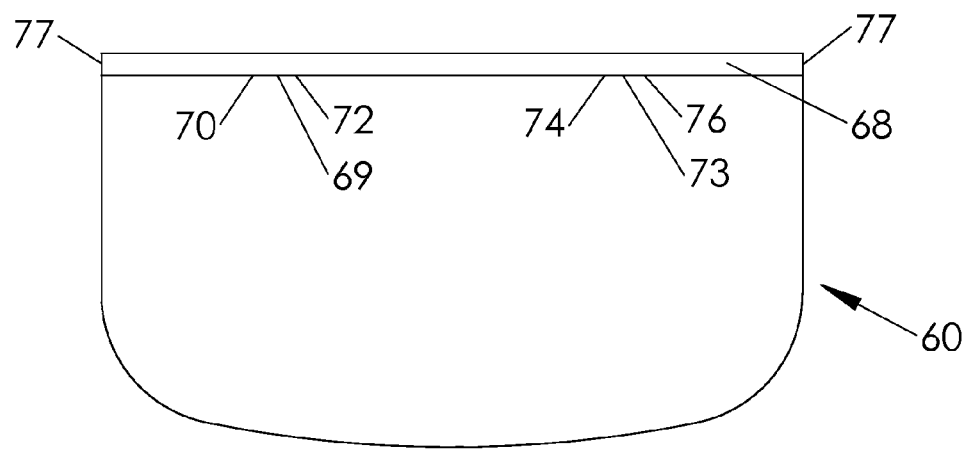
FIG. 9 is a front plan view of the second embodiment of a fabric sunshade.

FIG. 8 is a perspective view of a second embodiment of a fabric sunshade 60 assembled with a pair of glasses 62, and FIG. 9 is a front plan view of the sunshade 60 of the second embodiment. The glasses 62 shown with this second embodiment differ from the glasses 30 shown with the first embodiment because the temples 64 in FIG. 8 have curved portions 66 that are intended to fit behind the ears of a wearer. A sunshade of the second embodiment is substantially the same as a sunshade of the first embodiment described above, however in this second embodiment the single passageway 68 has a pair of spaced apart slits 69, 73 therein extending therethrough disposed between ends 70, 72; 74, 76 of the slits for receiving the temples 64 of the glasses, each of the slits 69, 73 being spaced apart from the open ends 77 of the passageway 68. The slits are located at an intersection of the folded over portion of the piece of cloth with the main portion of the piece of cloth, and may be constructed by leaving gaps in a sewn seam, or adhesive, or heat staking that secures the folded over portion to the main portion of the piece of cloth.

Figure 10:
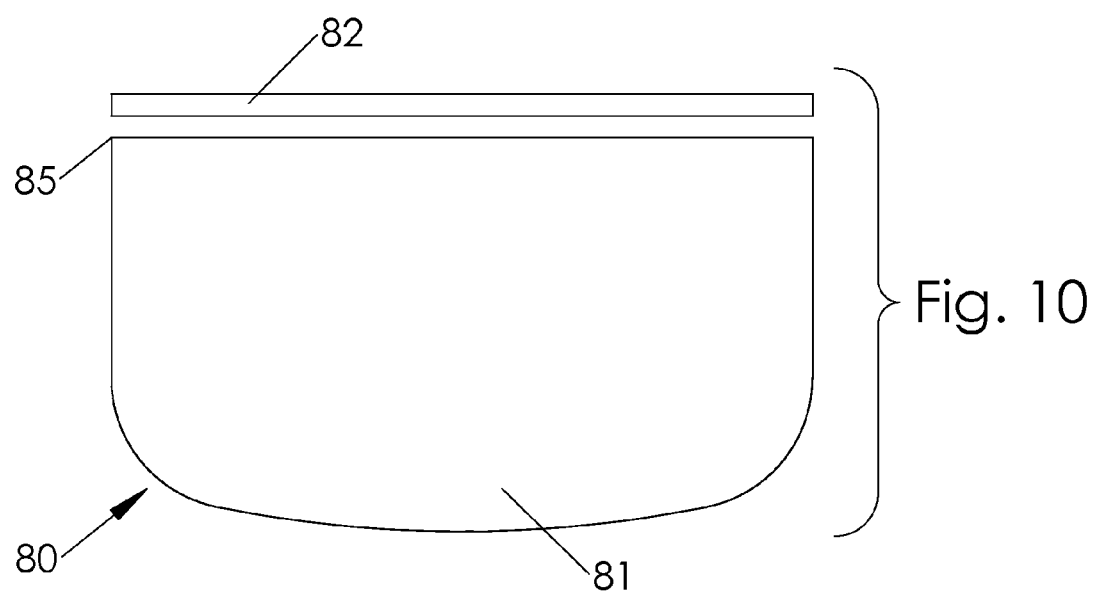
FIG. 10 is an exploded view of a third embodiment of a fabric sunshade for use with glasses.
Figure 11:
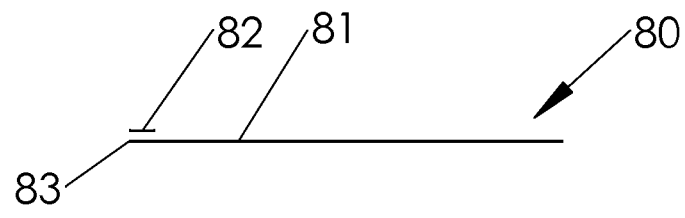
FIG. 11 is a schematic side view of the third embodiment of the fabric sunshade.
Figure 12:
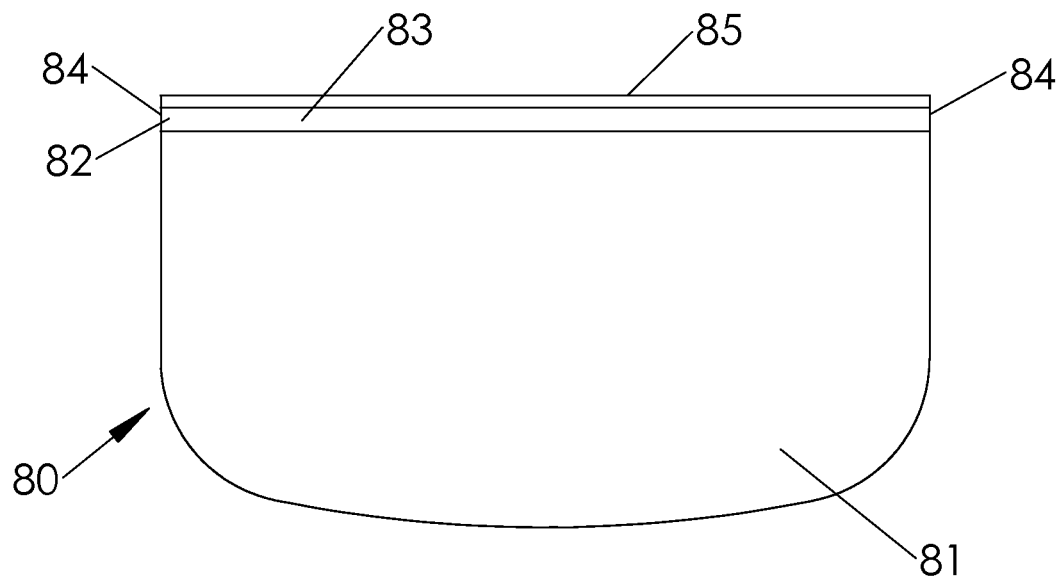
FIG. 12 is a front plan view of the third embodiment of the fabric sunshade.

FIG. 10 is an exploded view of a third embodiment of a fabric sunshade 80 for use with glasses, and FIG. 11 is a schematic side view of the third embodiment of the fabric sunshade. The third embodiment begins with a fabric blank 81 which is a piece of cloth shaped like that shown in FIG. 5 with respect to the first embodiment. Instead of forming a passageway by folding over an edge portion of the fabric blank a strip of cloth 82 is fixed to the piece of cloth by sewing, an adhesive, heat staking or any other suitable means. As used herein and in the claims the term "strip" is understood to have its' common meaning of a piece of something such as cloth or paper that is much longer than it is wide. A front plan view of a sunshade of this third embodiment is shown in FIG. 12, which looks like the first embodiment as shown in a plan view in FIG. 3. That is to say, as shown best in FIGS. 11 and 12 a single passageway 83 is defined in part by a strip of fabric 82 attached to a piece of fabric 81. While the strip of fabric 82 may comprise any suitable fabric, it is preferably a four-way stretch fabric, and most preferably an elastic fabric. As used herein and in the claims an "elastic fabric" is understood to be a fabric containing interwoven or knit strands of flexible rubber or a similar substance allowing it to stretch and return to its original shape. It is understood that this third embodiment may include the feature of the second embodiment whereby the single passageway defined in part by the separate strip may have slits therein as shown in FIGS. 8 an 9 and described with respect thereto.

There may be provided in accordance with this third embodiment of the invention a sunshade comprising a piece of a four-way stretch fabric 81, the sunshade having an edge 85 and provided with a passageway 83 having a pair of open ends 84, the passageway located adjacent or near the edge 85 of the sunshade and extending at least substantially parallel to the edge of the sunshade for receiving the temples of a pair of glasses to attach the sunshade to the glasses, the passageway being formed at least in part by a strip 82 of an elastic fabric attached to the piece of four-way stretch fabric. When assembled with glasses the sunshade extends between the temples of the glasses and when the glasses and sunshade are worn by a person a portion of the passageway is disposed on a back side of the head of the person and the sunshade extends downward to shade at least a portion of a neck of the person.

Figure 13:
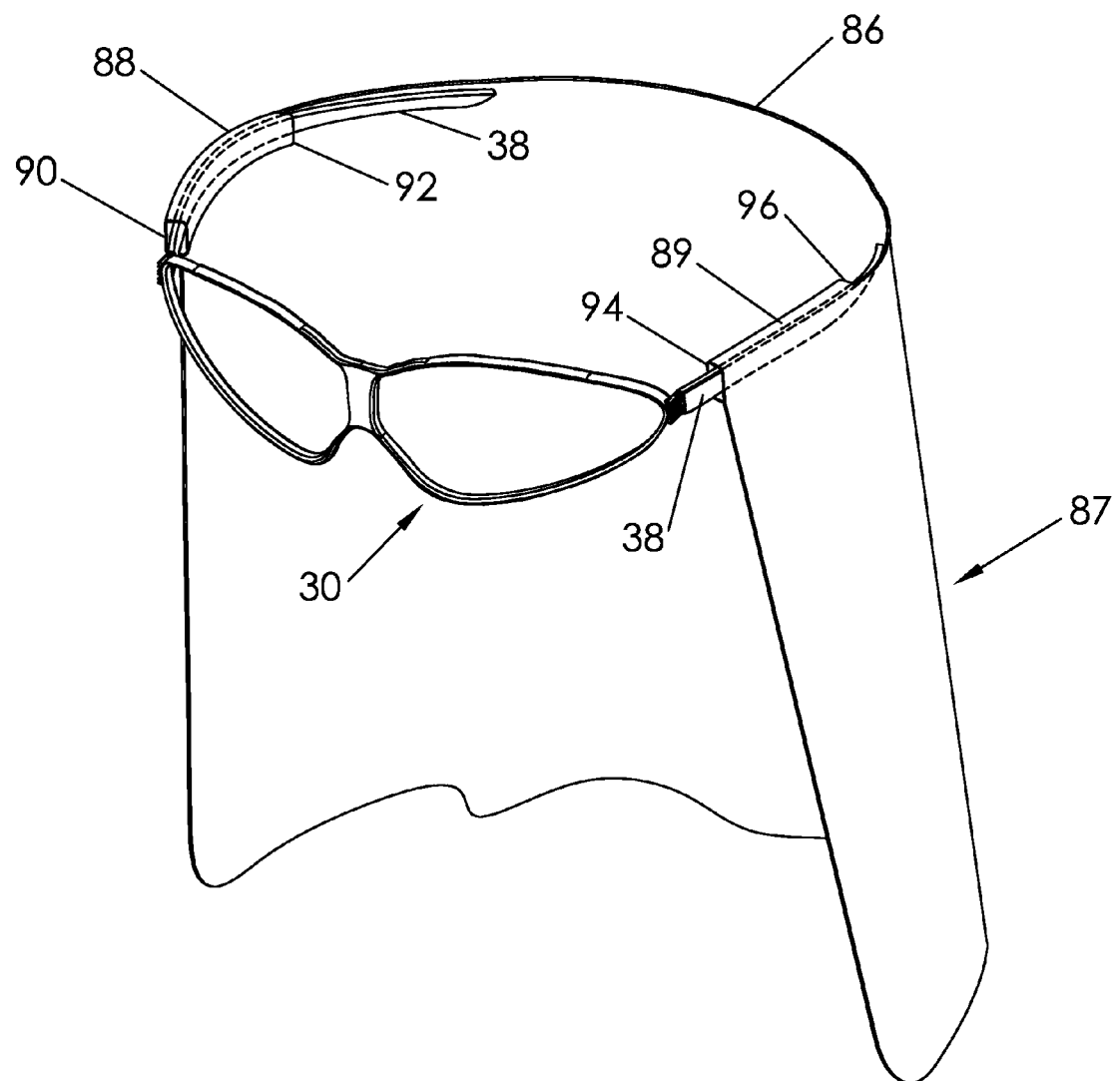
FIG. 13 is a perspective view of a fourth embodiment of a fabric sunshade assembled with a pair of glasses.
Figure 14:
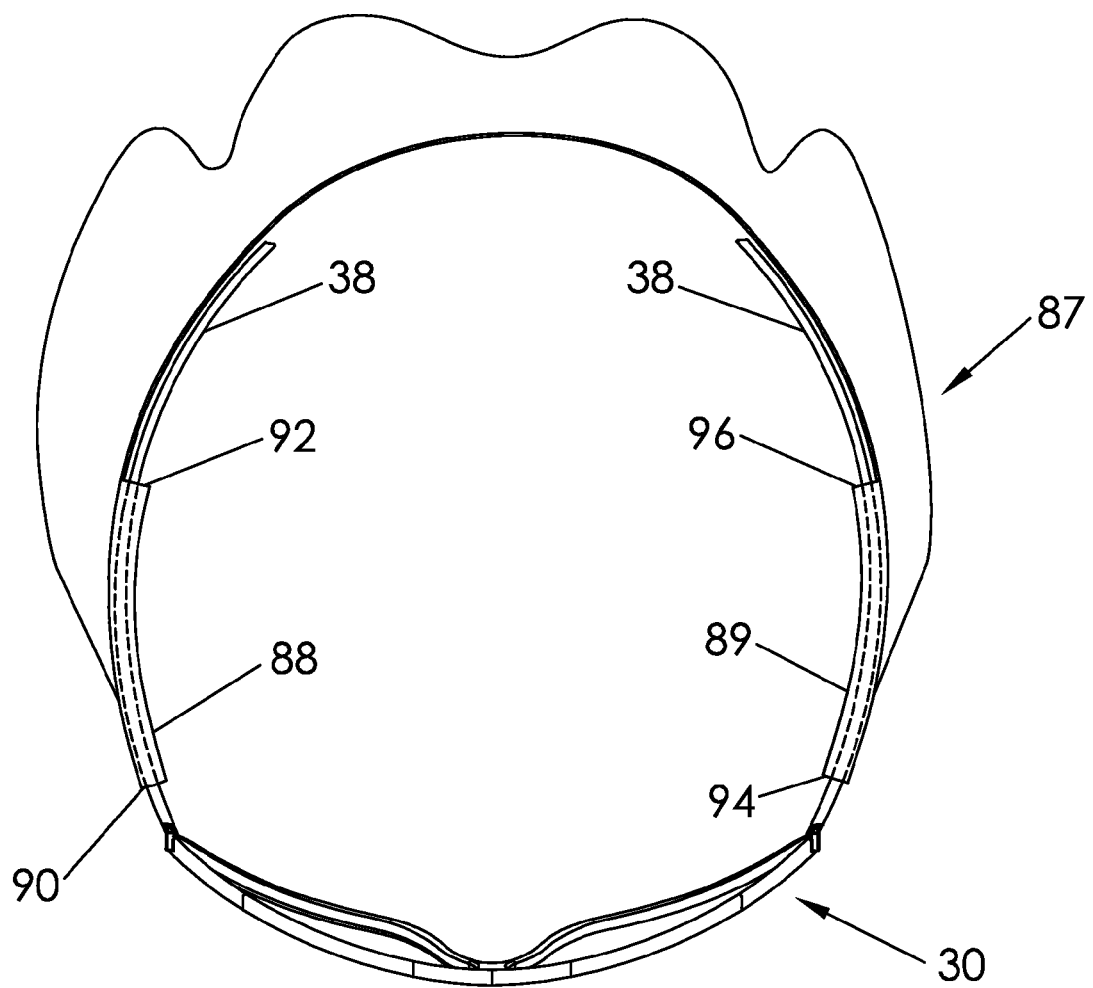
FIG. 14 is a top view looking down on the fourth embodiment of the fabric sunshade assembled with a pair of glasses.

Referring next to FIGS. 13 and 14 there is shown a perspective view of a fourth embodiment of a fabric sunshade 87 assembled with a pair of glasses 10 and a top view looking down on the same assembly. This embodiment is substantially like the first embodiment described above with the exception that the fabric sunshade 87 has a pair of spaced apart passageways 88, 89 that are each located at or near an edge 86 of the sunshade and each have a pair of open ends 90, 92; 94, 96 wherein each of the passageways 82, 84 is configured to receive one of the temples 38 of the glasses 30.

Figure 15:
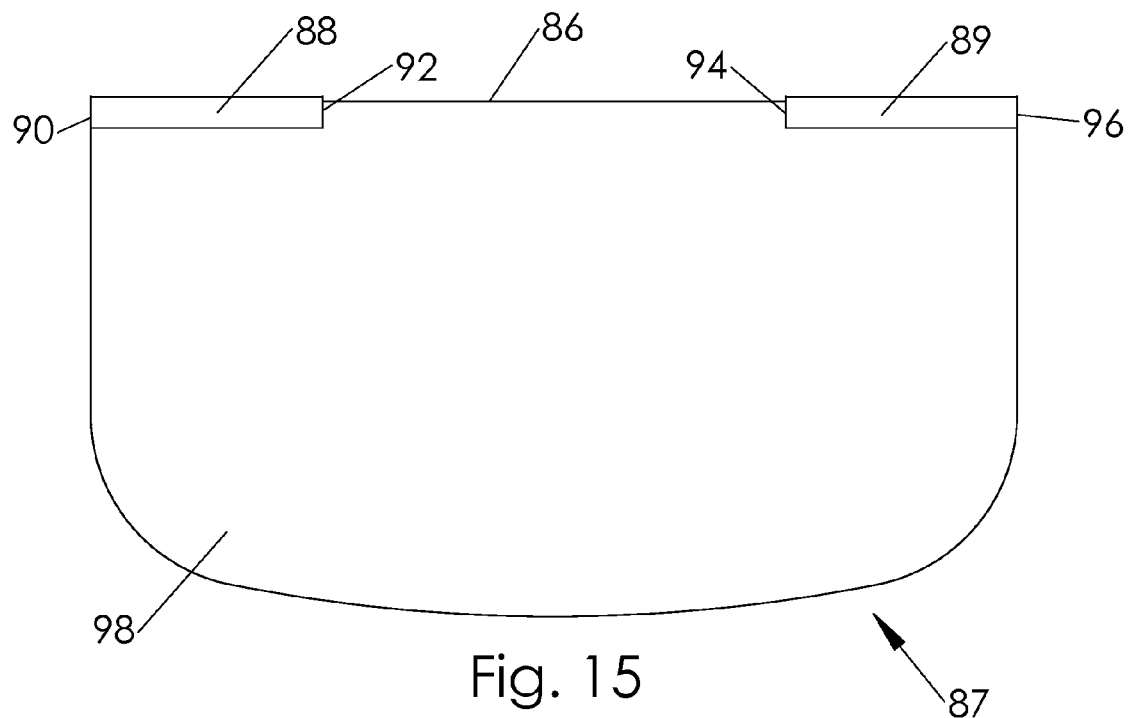
FIG. 15 is a front plan view of the fourth embodiment of the fabric sunshade for use with glasses.
Figure 16:
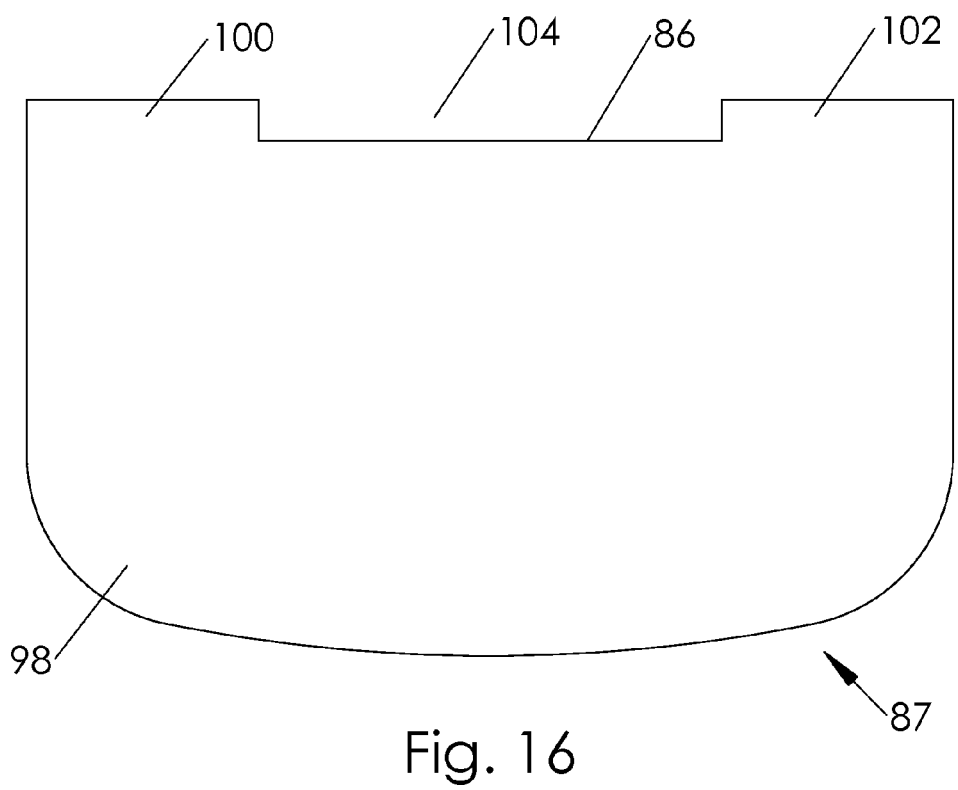
FIG. 16 is a plan view of the fourth embodiment of the fabric sunshade as a blank during the process of manufacturing the sunshade.

FIG. 15 is a front plan view of the fourth embodiment of the fabric sunshade 87, and FIG. 16 is a plan view of a piece of fabric 98 that is a blank used in the process of manufacturing the fourth embodiment. The piece of fabric has a pair of spaced apart edge portions 100, 102, in the form of tabs, spaced apart by an indentation 104. In this embodiment each of the passageways 88, 89 comprises a folded over edge portion 100, 102 of the piece of fabric 98 that is fixed to the piece of fabric to form a passageway. As described above with respect to the second embodiment referring to FIGS. 5-7 the edge portions 100, 102 are each folded about a fold line A in a direction B and then fixed to a main portion of the piece of fabric by stitching, an adhesive, heat staking or any other suitable means to form the passageways 88, 89 which each are open at both ends to accommodate the temples of a pair of glasses. Elastic characteristics of the four-way stretch fabric cause the fabric to grip the temples and aid in securing the sunshade to the glasses.

Figure 17:
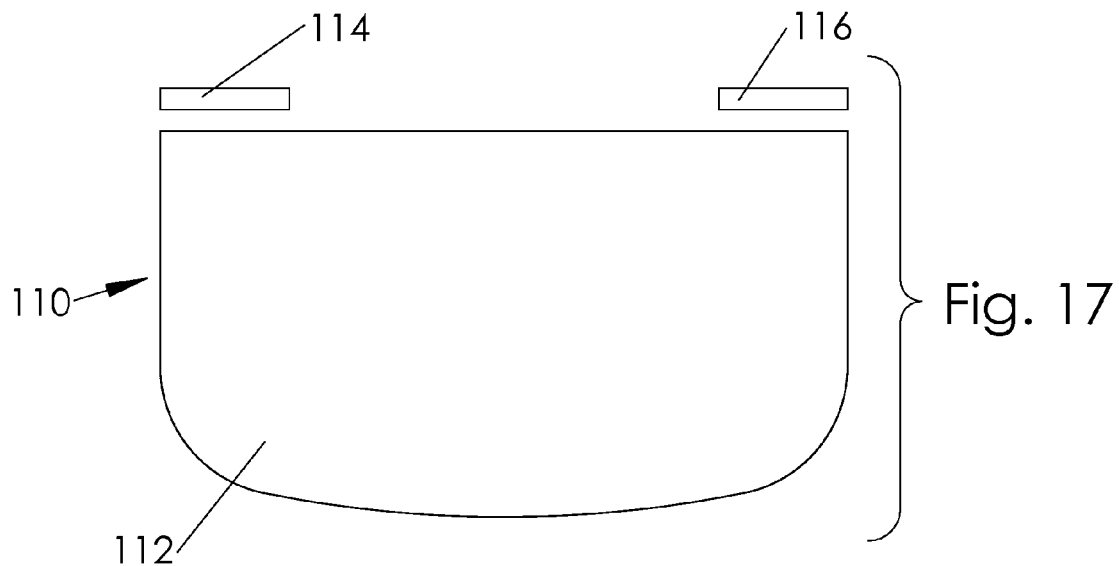
FIG. 17 is an exploded view of a fifth embodiment of a fabric sunshade for use with glasses.
Figure 18:
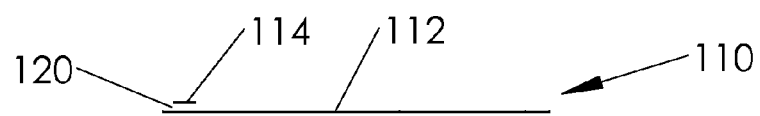
FIG. 18 is a schematic side view of the fifth embodiment of the fabric sunshade.
Figure 19:
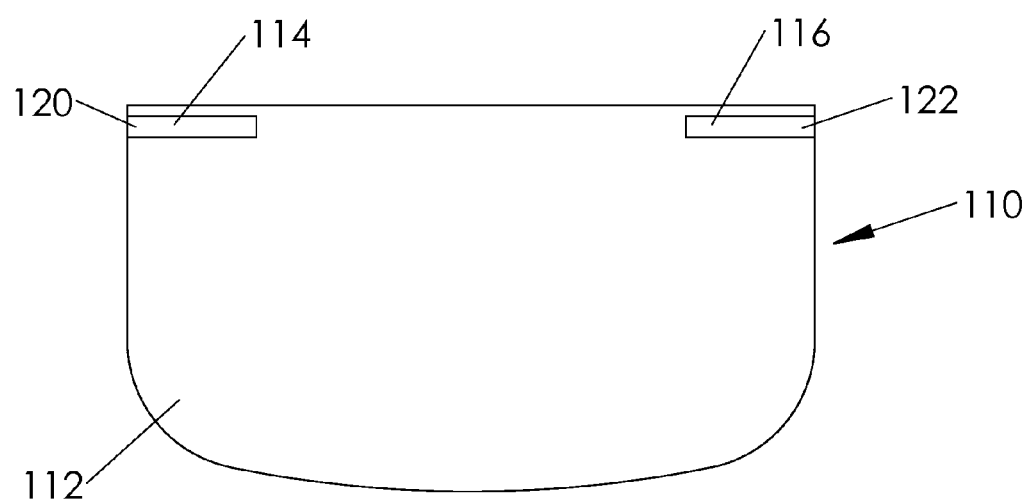
FIG. 19 is a front plan view of the fifth embodiment of the fabric sunshade.

FIG. 17 is an exploded view of a fifth embodiment of a fabric sunshade 110 for use with glasses, FIG. 18 is a schematic side view of the fifth embodiment of the fabric sunshade, and FIG. 19 is a front plan view of the fifth embodiment. The fifth embodiment begins with a fabric blank 112 which is a piece of cloth shaped like that shown in FIG. 5 with respect to the first embodiment. Instead of forming a passageway by folding over an edge portion of the fabric blank two strips of cloth 114, 116 are fixed to the piece of cloth by sewing, an adhesive, heat staking or any other suitable means. That is to say the fifth embodiment is provided with a pair of spaced apart passageways 120, 122 wherein each of the passageways is defined in part by a strip of fabric 114, 116 attached to the piece of fabric 112. Each of the passageways has a pair of open ends for receiving the temples of a pair of glasses. While the strips of fabric 114, 116 may comprise any suitable fabric, it is preferably a four-way stretch fabric. When a fabric sunshade of the fifth embodiment is attached to a pair of glasses the assembly has substantially the structure shown in FIGS. 13 and 14.

Figure 20:
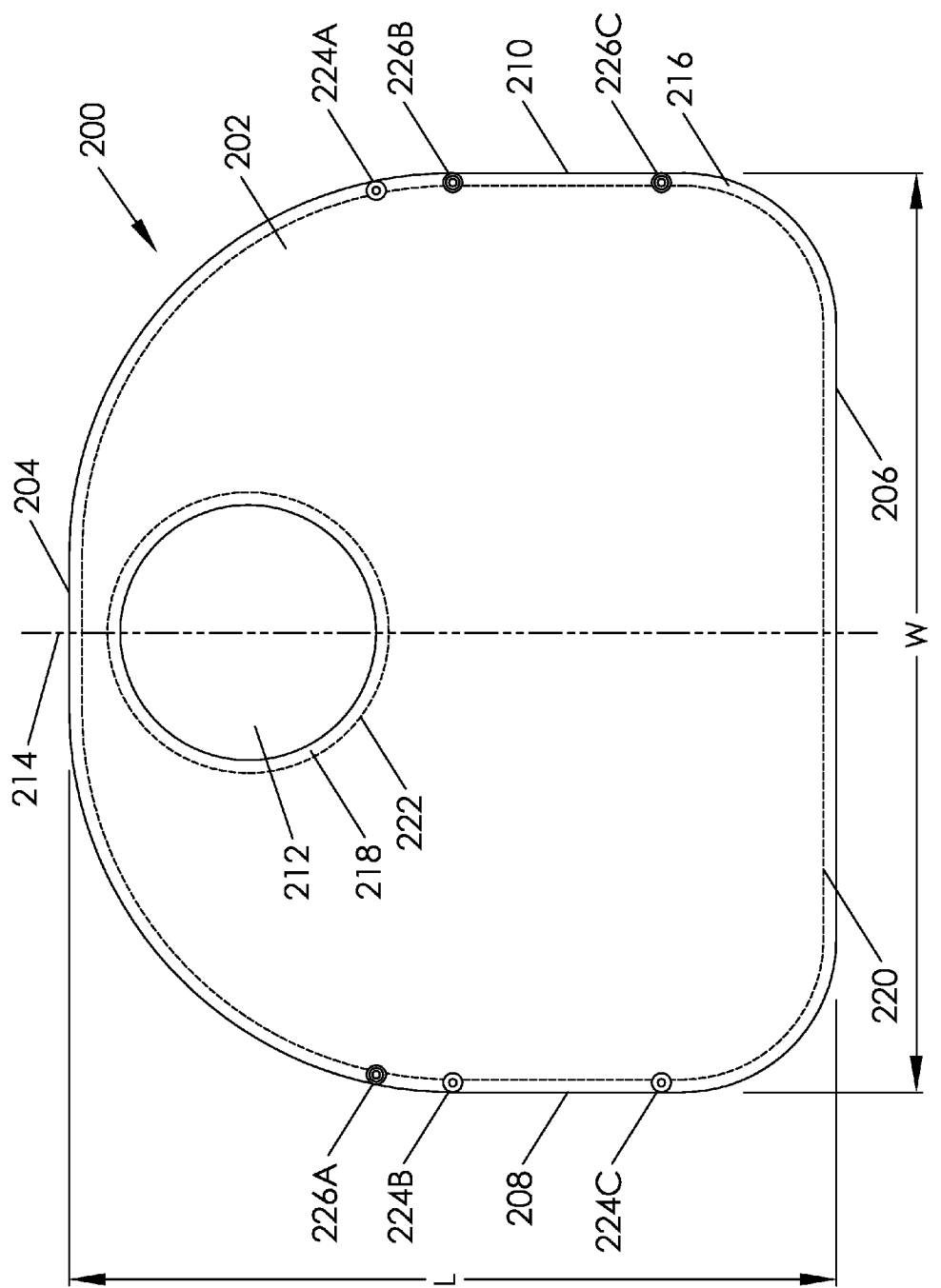
FIG. 20 is a plan view of a sixth embodiment of a fabric sunshade.

Referring next to FIG. 20 there is shown a fabric sunshade 200 according to a sixth embodiment. The sunshade 200 comprises a piece of fabric 202. The sunshade has a first edge 204, which appears as the top edge of the sunshade in FIG. 20, an opposed second edge 206, which appears as the bottom edge of the sunshade in FIG. 20, and third 208 and fourth 210 edges that each extend between the first edge 204 and the second edge 206, these appearing as the left and right edges of the sunshade in FIG. 20. The sunshade 202 has an opening 212 therein that is disposed nearer to the first edge 204 of the sunshade, which appears as the top edge of the sunshade in FIG. 20, than to the second edge 206 of the sunshade, which appears as the bottom edge of the sunshade in FIG. 20. The sunshade is symmetrical about an axis 214 that extends from the first edge 214 of the sunshade to the second edge 206 of the sunshade and passes through the opening 212.

While the of the sunshade is shown as having a width W that is greater than its length L, the exact dimensions and shape of the of the sunshade can be varied to fit persons of various sizes, and to take into consideration the physical characteristics of the fabric selected for the sunshade. As stated above, while it is contemplated that a sunshade according to the embodiments of FIGS. 20 to 23 may be manufactured using any suitable fabric, whether or not it is stretchable, it is believed to be advantageous for the fabric employed in the sunshades of each of the embodiments disclosed herein to comprise a stretchable fabric, preferably a four-way stretch fabric. While the opening 212 in the of the sunshade is shown as being round in FIGS. 20 to 23, it is understood that the size and shape of the opening may be varied to fit persons of various sizes, and to take into consideration the physical characteristics of the fabric selected for use in the sunshade. It is preferred that the transitions between the edges 204-210 of the sunshade 202 be curved to reduce stress on the fabric in use, and to allow the sunshade to drape on the wearer in a more presentable and functional manner. Preferably all of the edges of the sunshade are hemmed such as a hem 216 around the entire perimeter of the sunshade and a hem 218 around the opening 212 to prevent unraveling of the fabric. Preferably the hems are secured with stitching 220, 222.

In close proximity to the third 208 and fourth 210 edges the of the sunshade, which appear as the left and right edges of the of the sunshade in FIG. 20, there are provided complementary sets of fastening devices 224 A-C, 226 A-C that may be used to fasten a first portion of the sunshade to a second portion of the sunshade when the of the sunshade is folded over on itself either in a direction perpendicular to the axis of symmetry 214 or in a direction parallel to the axis of symmetry. As used herein and in the claims with regards to the sixth through ninth embodiments disclosed herein the term "close proximity" is understood to have fairly broad latitude meaning that the fastening devices are near enough to the third and fourth edges of the of the sunshade, which are oriented generally vertical when a sunshade is being worn by a person, such that the sunshade can be retained in a desired configuration when being worn. In a sunshade 200 of the sixth embodiment shown in FIG. 20 the fastening devices are complementary snaps 224 A-C, 226 A-C. More specifically in this sixth embodiment the fastening device located in close proximity to one of the third and fourth edges 208, 210 of the sunshade comprises a first male snap 224A and a first female snap 226B, the first male snap 224A being located closer to the first edge 204 of the sunshade than the first female snap 226B. The fastening device located in close proximity to the other of the third and fourth edges of the sunshade comprises a second male snap 224B and a second female snap 226A, the second female snap 226A being located closer to the first edge 204 of the sunshade than the second male snap 224B. This arrangement provides for fastening folded over portions of the sunshade to one another whether the first edge 204 of the sunshade is folded over towards the second edge 206 of the sunshade, or the third or fourth edges 208, 210 of the of the sunshade are folded over towards one another. When the first edge 204 of the sunshade is folded over towards the second edge 206 of the sunshade, in a direction parallel to the axis of symmetry 214, the first male snap 224A is fixed to the second female snap 226B and the second male snap 224B is fixed to the second female snap 226A to yield a configuration like that shown in FIG. 24, which is described in more detail below. Optionally, the sunshade may be further provided with a third male snap 224C located in close proximity to one of the third and fourth edges 208, 210 of the sunshade and a third female snap 226C located in close proximity to the other of the third and fourth edges 208, 210 of the sunshade, the third male snap 224C and the third female snap 226C being located closer to the second edge 206 of the sunshade than the second male snap 224B and the second female snap 226B. When the third or fourth edges 208, 210 of the of the sunshade are folded over towards one another in a direction perpendicular to the axis of symmetry 214 to yield a configuration like that shown in FIG. 26, which is described in more detail below, the first male snap 224A is fixed to the second female snap 226A, the second male snap 224B is fixed to the first female snap 226B, and the third male snap 224C is fixed to the third female snap 226C.

Figure 21:
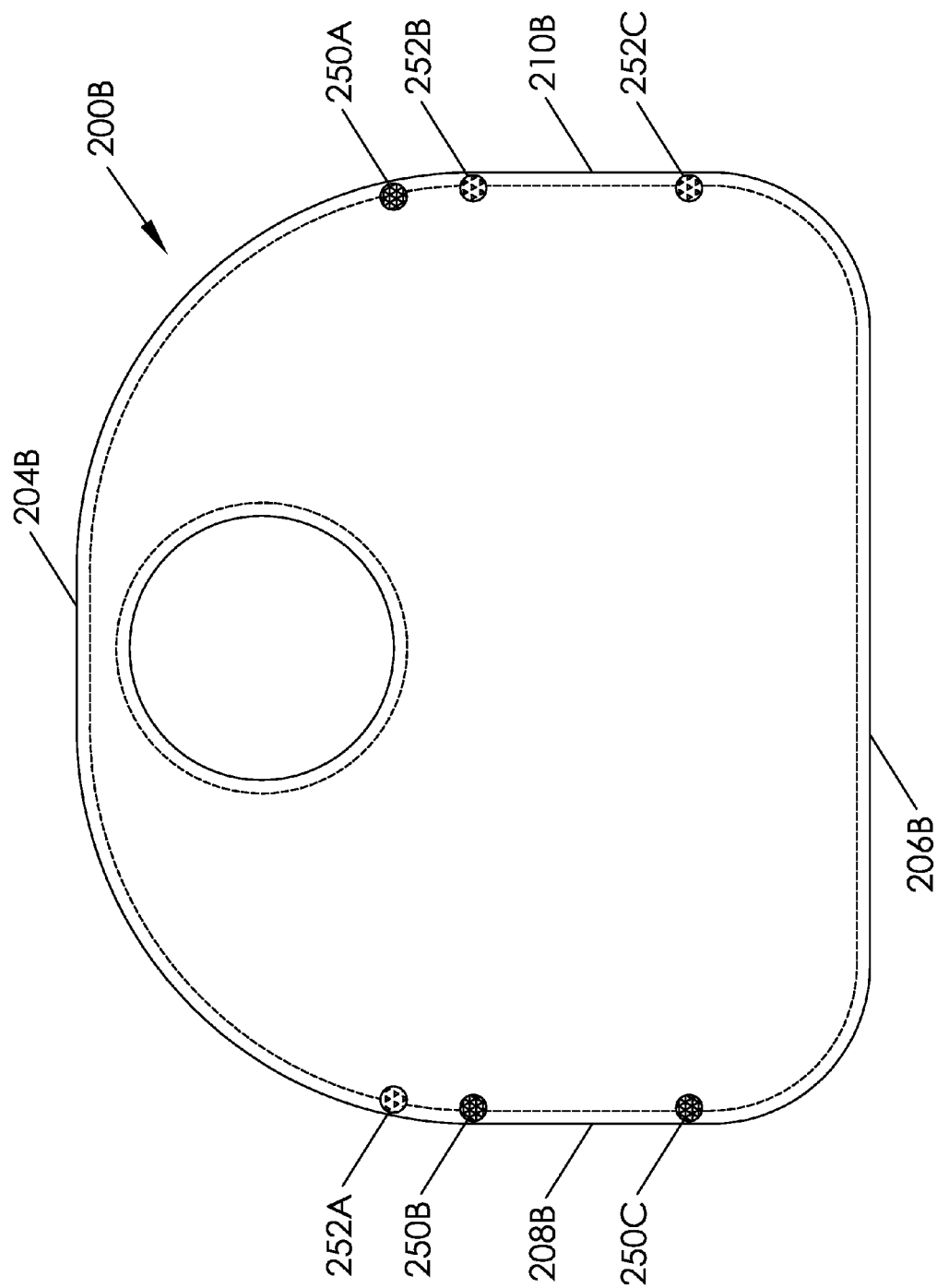
FIG. 21 is a plan view of a seventh embodiment of a fabric sunshade.

Referring next to FIG. 21 there is shown a plan view of a seventh embodiment of a fabric sunshade 200B. This sunshade is substantially like the sixth embodiment of FIG. 20 with the exception that in this embodiment the fastening devices located in close proximity to one of the third and fourth edges 208B, 210B of the sunshade comprise complementary patches of hook and loop material 252 A-C, 250 A-C. More specifically in this seventh embodiment the fastening devices located in close proximity to one of the third and fourth edges 208B, 210B of the sunshade comprise a first patch of hook material 252A and a second patch of loop material 250B, the first patch of hook material 252A being located closer to the first edge 204B of the sunshade than the second patch of loop material 250B, and the fastening device located in close proximity to the other of the third and fourth edges of the sunshade comprises second patch of hook material 252B and a first patch of loop material 250A, the first patch of loop material 250A being located closer to the first edge 204B of the sunshade than the second patch of hook material 252B. This arrangement provides for fastening folded over portions of the sunshade to one another whether the first edge 204B of the sunshade is folded over towards the second edge 206B, or the third or fourth edges 208B, 210B of the sunshade are folded over towards one another. When the first edge 204B of the sunshade is folded over towards the second edge 206B of the sunshade, in a direction parallel to the axis of symmetry, the first patch of hook material 252A is fixed to the second patch of loop material 250B and the second patch of hook material 252B is fixed to the second patch of loop material 250A to yield a configuration like that shown in FIG. 24, which is described in more detail below. Optionally, the sunshade may be further provided with a third patch of hook material 252C located in close proximity to one of the third and fourth edges 208B, 210B of the sunshade and a third patch of loop material 250C located in close proximity to the other of the third and fourth edges 208B, 210B of the sunshade, the third patch of hook material 252C and the third patch of loop material 250C being located closer to the second edge 206B of the sunshade than the second patch of hook material 252B and the second patch of loop material 250B. When the third or fourth edges 208B, 210B of the of the sunshade are folded over towards one another in a direction perpendicular to the axis of symmetry to yield a configuration like that shown in FIG. 26, which is described in more detail below, the first patch of hook material 252A is fixed to the second patch of loop material 250A, the second patch of hook material 252B is fixed to the first patch of loop material 250B, and the third patch of hook material 252C is fixed to the third patch of loop material 250C.

Figure 22:
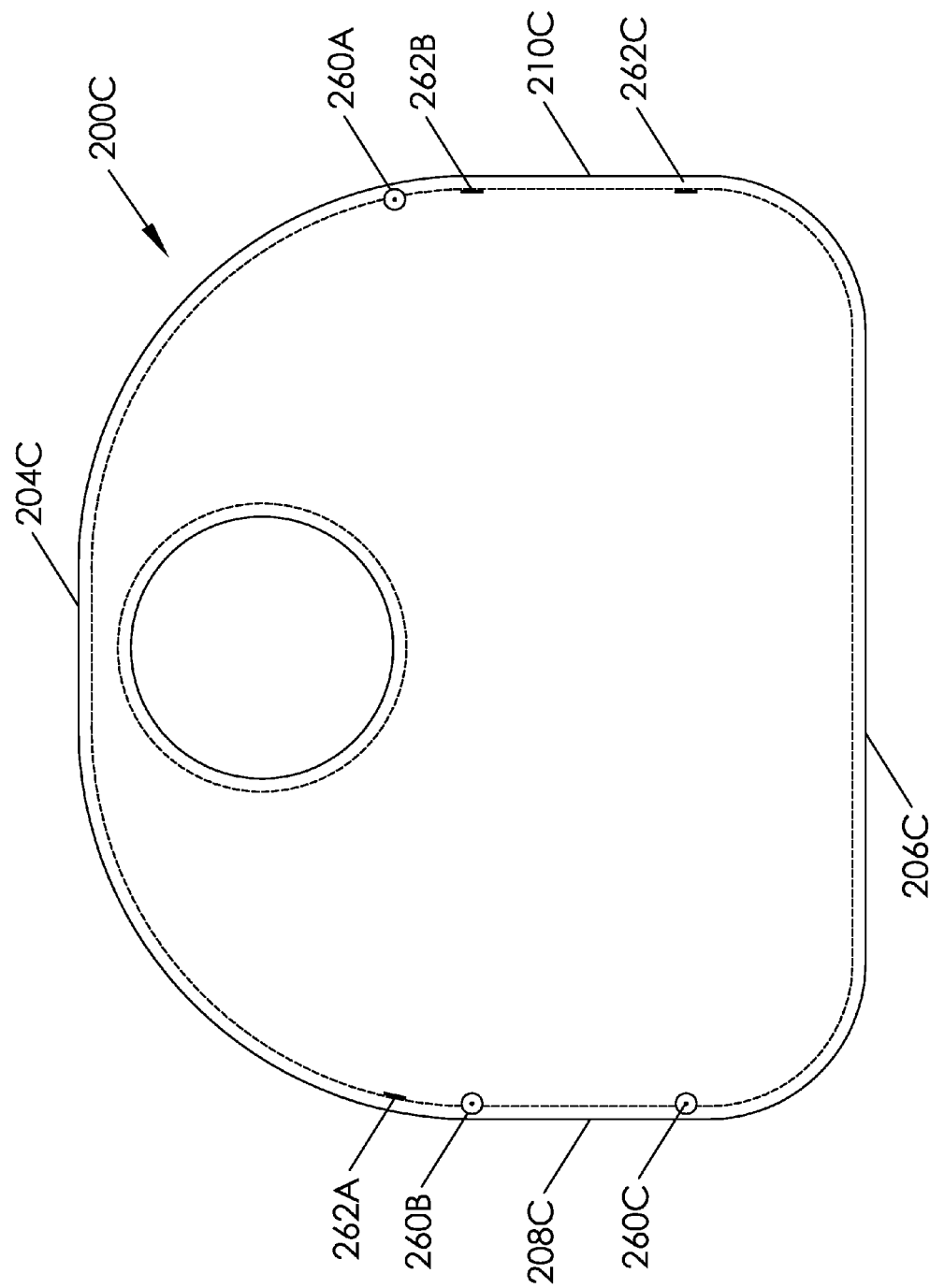
FIG. 22 is a plan view of an eighth embodiment of a fabric sunshade.

Referring next to FIG. 22 there is shown a plan view of an eighth embodiment of a fabric sunshade 200C. This sunshade is substantially like the sixth embodiment of FIG. 20 with the exception that in this embodiment the fastening devices located in close proximity to one of the third and fourth edges 208C, 210C of the sunshade comprise complementary buttons 260 A-C and buttonholes 262 A-C. More specifically in this eighth embodiment the fastening devices located in close proximity to one of the third and fourth edges 208C, 210C of the sunshade comprises a first button 260A and a first buttonhole 262B, the first button 260A being located closer to the first edge 204C of the sunshade than the first buttonhole 262B. The fastening device located in close proximity to the other of the third and fourth edges of the sunshade comprises second button 260B and a second buttonhole 262A, the second buttonhole 262A being located closer to the first edge 204C of the sunshade than the second button 260B. This arrangement provides for fastening folded over portions of the sunshade to one another whether the first edge 204C of the sunshade is folded over towards the second edge 206C of the sunshade, or the third or fourth edges 208C, 210C of the sunshade are folded over towards one another. When the first edge 204C of the sunshade 200C is folded over towards the second edge 206C of the sunshade, in a direction parallel to the axis of symmetry, the first button 260A is fixed to the second buttonhole 262B and the second button 260B is fixed to the second buttonhole 262A to yield a configuration like that shown in FIG. 24, which is described in more detail below. Optionally, the sunshade may be further provided with a third button 260C located in close proximity to one of the third and fourth edges 208C, 210C of the sunshade and a third buttonhole 262C is located in close proximity to the other of the third and fourth edges 208C, 210C of the sunshade, the third button 260C and the third buttonhole 262C being located closer to the second edge 206C of the sunshade than the second button 260B and the second buttonhole 262B. When the third or fourth edges 208C, 210C of the of the sunshade are folded over towards one another in a direction perpendicular to the axis of symmetry to yield a configuration like that shown in FIG. 26, which is described in more detail below, the first button 260A is fixed to the second buttonhole 262A, the second button 260B is fixed to the first buttonhole 262B, and the third button 260C is fixed to the third buttonhole 262C.

Figure 23:
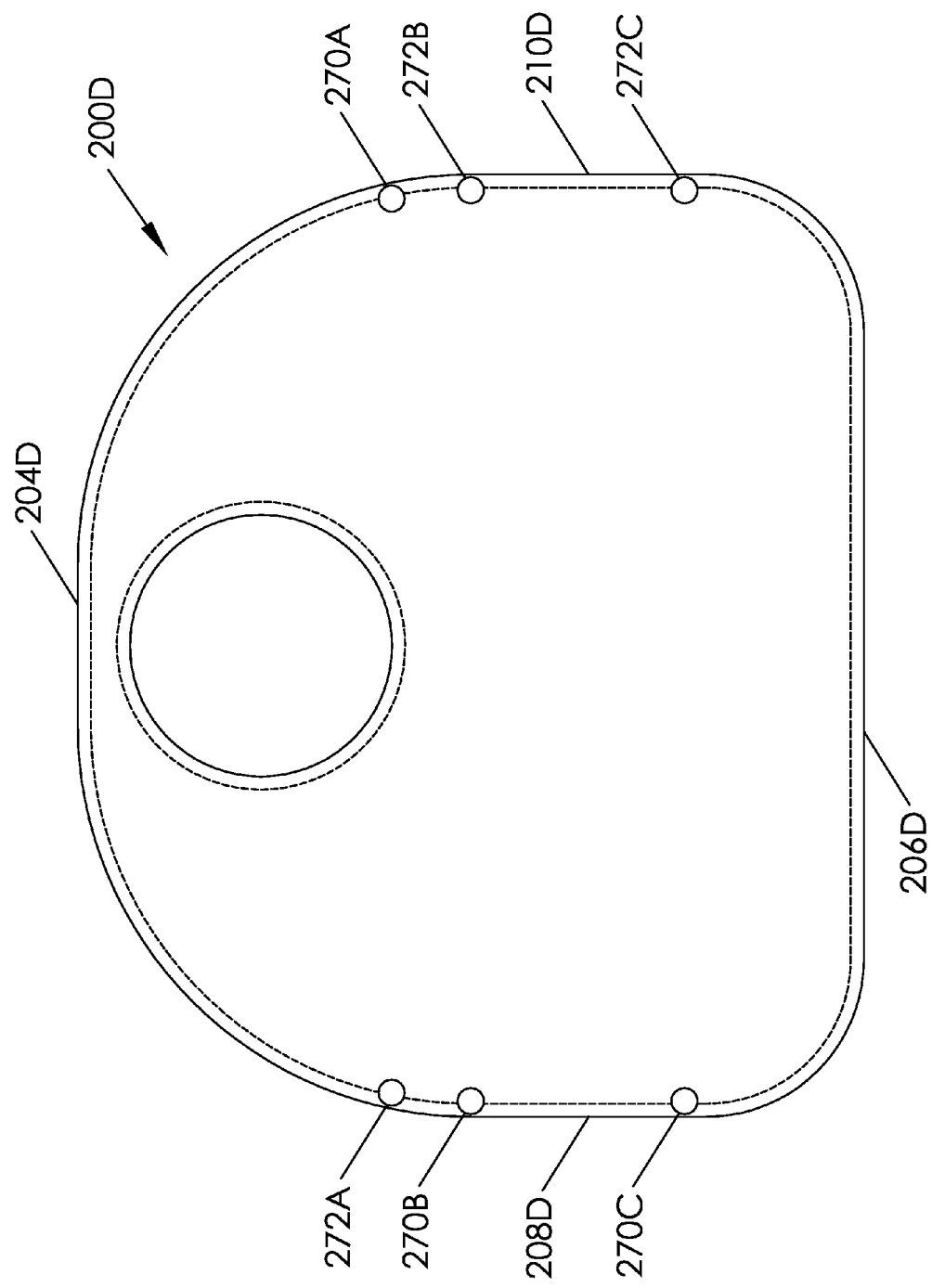
FIG. 23 is a plan view of a ninth embodiment of a fabric sunshade.

Referring next to FIG. 23 there is shown a plan view of a ninth embodiment of a fabric sunshade 200D. This sunshade is substantially like the sixth embodiment of FIG. 20 with the exception that in this embodiment the fastening devices located in close proximity to one of the third and fourth edges 208D, 210D of the sunshade comprise complementary magnetic members 270 A-C and ferrous members 272 A-C. More specifically in this ninth embodiment the fastening devices located in close proximity to one of the third and fourth edges 208D, 210D of the sunshade comprise a first magnetic member 270A and a first ferrous member 272B, the first magnetic member 270A being located closer to the first edge 204D of the sunshade than the first ferrous member 272B. The fastening devices located in close proximity to the other of the third and fourth edges of the sunshade comprise second magnetic member 270B and a second ferrous member 272A, the second ferrous member 272A being located closer to the first edge 204D of the sunshade than the second magnetic member 270B. This arrangement provides for fastening folded over portions of the sunshade to one another whether the first edge 204D of the sunshade is folded over towards the second edge 206D, or the third or fourth edges 208D, 210D of the sunshade 200D are folded over towards one another. When the first edge 204D of the sunshade 200D is folded over towards the second edge 206D of the sunshade, in a direction parallel to the axis of symmetry, the first magnetic member 270A is fixed to the second ferrous member 272B and the second magnetic member 270B is fixed to the second ferrous member 272A to yield a configuration like that shown in FIG. 24, which is described in more detail below. Optionally, the sunshade may be further provided with a third magnetic member 270C located in close proximity to one of the third and fourth edges 208D, 210D of the sunshade and a third ferrous member 272C located in close proximity to the other of the third and fourth edges 208D, 210D of the sunshade, the third magnetic member 270C and the third ferrous member 272C being located closer to the second edge 206D of the sunshade than the second magnetic member 270B and the second ferrous member 272B. When the third or fourth edges 208D, 210D of the of the sunshade are folded over towards one another in a direction perpendicular to the axis of symmetry to yield a configuration like that shown in FIG. 26, which is described in more detail below, the first magnetic member 270A is fixed to the second ferrous member 272A, the second magnetic member 270B is fixed to the first ferrous member 272B, and the third magnetic member 270C is fixed to the third ferrous member 272C.

Figure 24:
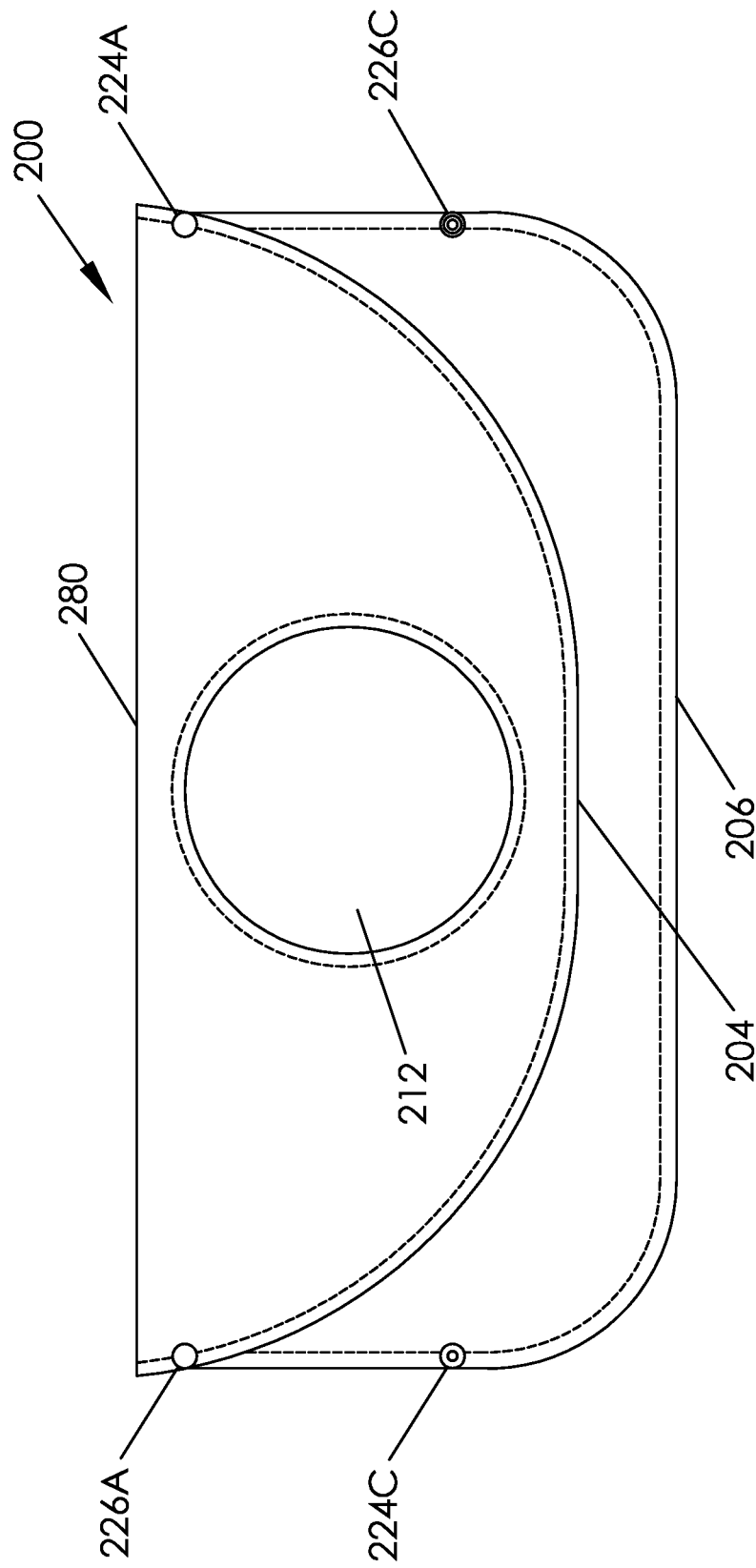
FIG. 24 shows the fabric sunshade of FIG. 20 with the fabric folded over on itself in a first direction and secured in the folded configuration by fastening devices.
Figure 25:
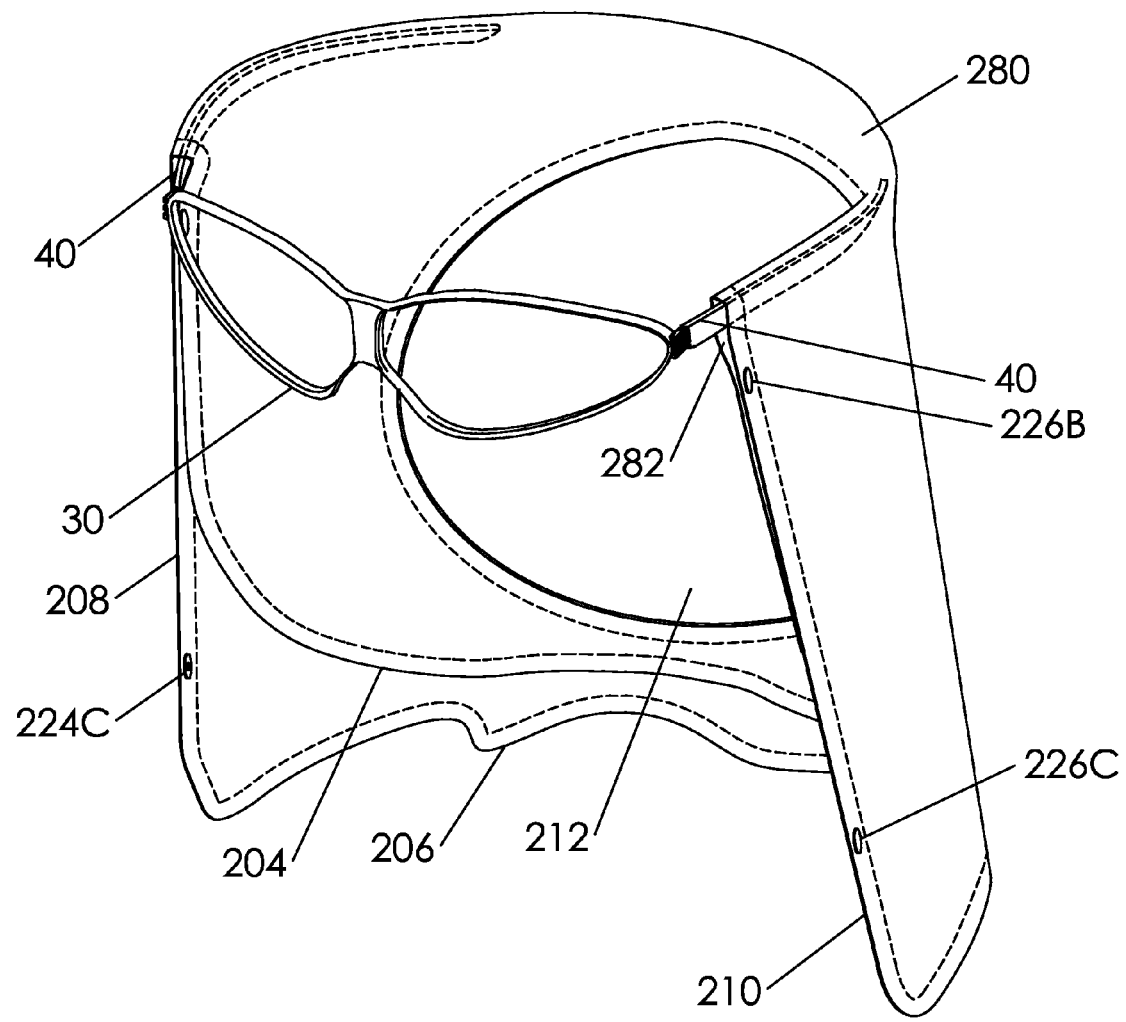
FIG. 25 shows the folded over fabric sunshade of FIG. 24 assembled with a pair of glasses.

FIG. 24 shows the fabric sunshade of FIG. 20 with the sunshade folded over on itself in a direction parallel to the axis of symmetry of the sunshade such that the first edge 204 of the sunshade is folded towards the second edge 206 of the sunshade. The fastening devices, in this instance complementary male and female snaps, are secured to one another as described above to secure the sunshade in the folded configuration. A fold line 280 formed by the folding over of the sunshade cooperates with the fastening devices 224, 226 to define a passageway 282. Best shown in FIG. 25, which shows the folded over fabric sunshade of FIG. 24 assembled with a pair of glasses 30, a passageway 282 has a pair of open ends for receiving a pair of temples 40 of a pair of glasses 30 to attach the sunshade to the glasses whereby the sunshade extends between the temples of the glasses and when the glasses and sunshade are worn by a person the sunshade extends downward to shade at least a portion of a neck of the person. It is understood of course that the fabric sunshades of seventh, eighth and ninth embodiments disclosed above may be folded in this same manner to be assembled with glasses, using the hook and loop fastening devices, buttons and buttonholes, or magnetic members and ferrous members. It is further understood that the fastening devices disclosed herein are only exemplary and that any other suitable fastening device may used without deviating from the scope of the disclosed invention.

Figure 26:
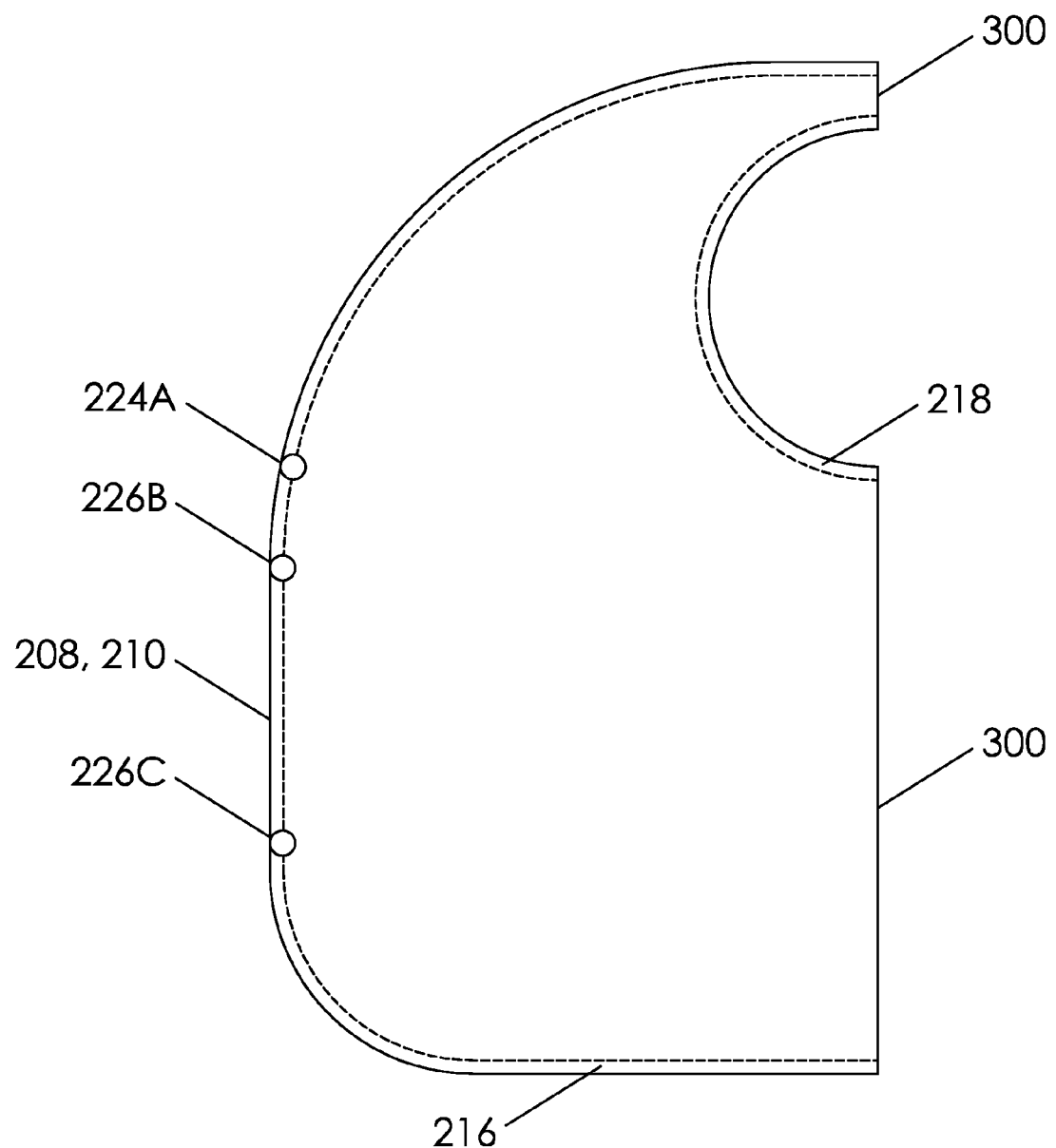
FIG. 26 shows the fabric sunshade of FIG. 20 with the fabric folded over on itself in a second direction and secured in the folded configuration by fastening devices
Figure 27:
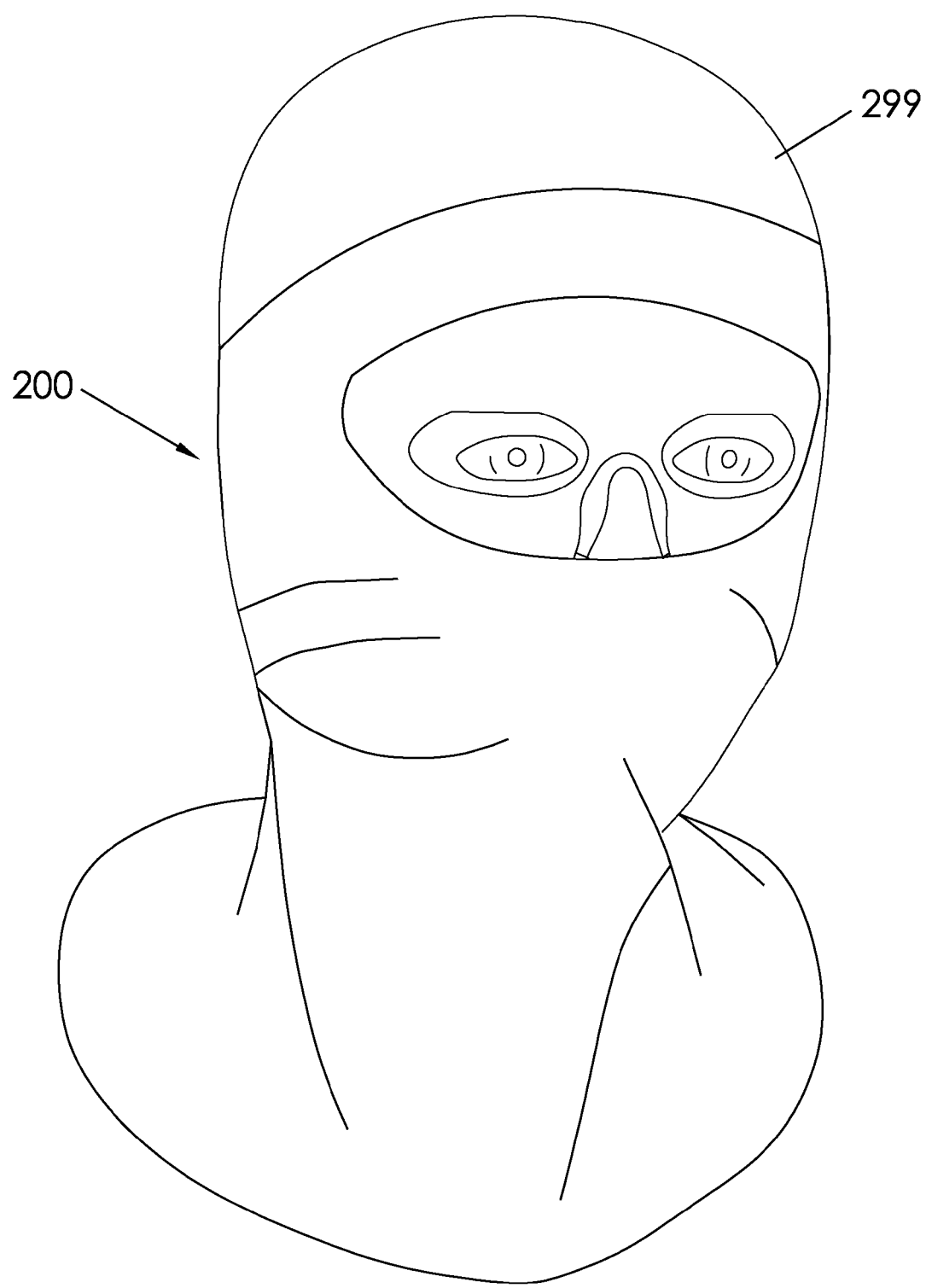
FIG. 27 shows the folded over fabric sunshade of FIG. 26 being worn by a person.
Figure 28:
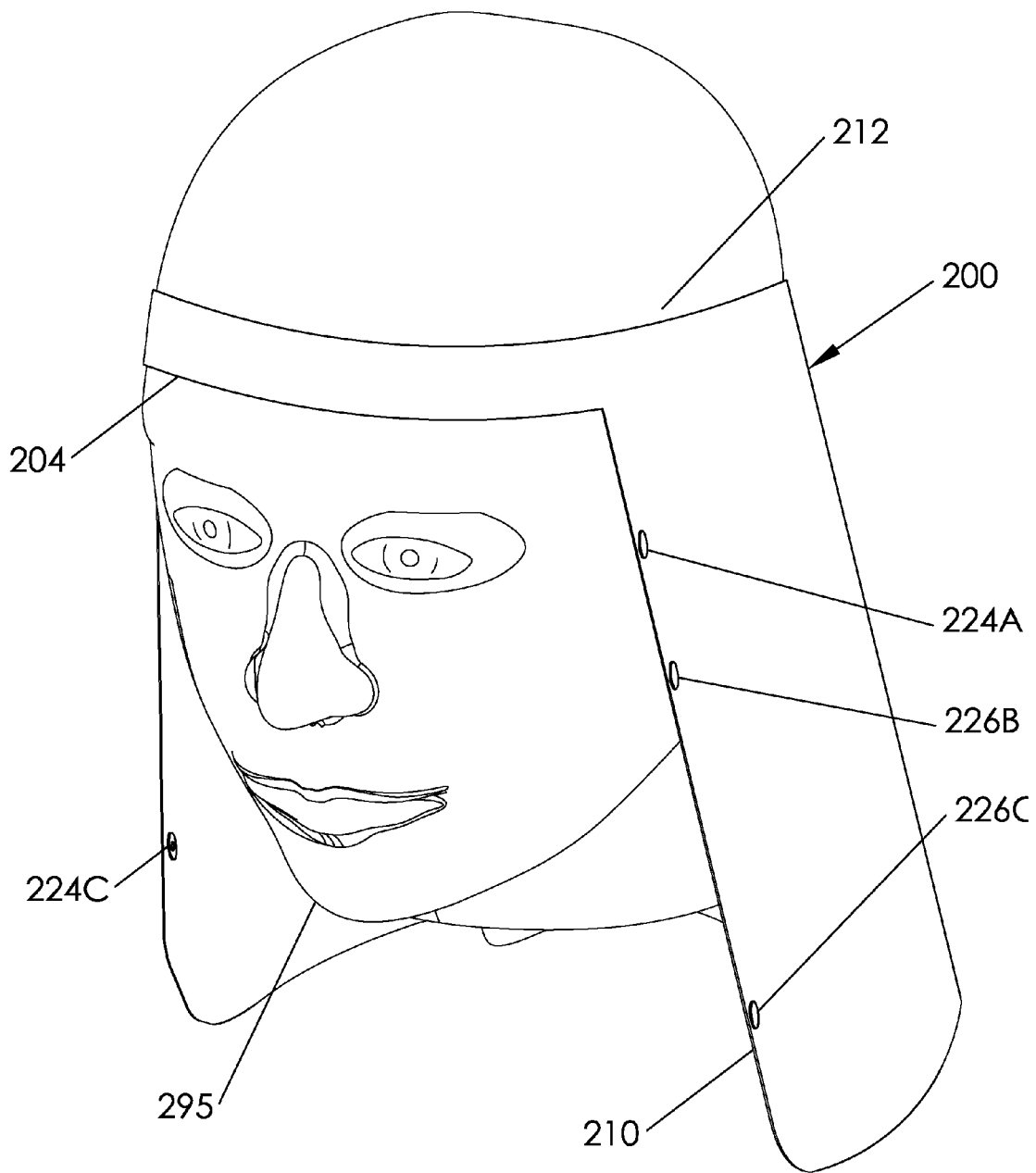

It is an advantageous feature of the fabric sunshades of the sixth through ninth embodiments disclosed herein that these fabric sunshades may be worn by a person in more than one configuration. FIG. 26 shows the fabric sunshade 200 of FIG. 20 with the sunshade folded over on itself, about a fold line 300, in a direction perpendicular to the axis of symmetry of the sunshade such that the third and fourth edges 208, 210 of the sunshade are juxtaposed and adjacent to one another. The fastening devices, in this instance the complementary male and female snaps, secured to one another to secure the sunshade in the folded configuration as described above. FIG. 27 shows the folded over fabric sunshade 200 of FIG. 26 being worn by a person. FIG. 27 shows the folded over fabric sunshade 200 of FIG. 26 being worn by a person 299 to protect the wearer's lower face and neck. It is understood of course that the fabric sunshades of seventh, eighth and ninth embodiments disclosed above may be folded in this same manner to be worn by a person as shown in FIG. 27 using the hook and loop fastening devices, buttons and buttonholes, or magnetic members and ferrous members. It is further understood that the fastening devices disclosed herein are only exemplary and that any other suitable fastening device may used without deviating from the scope of the disclosed invention.

Another functional aspect of the fabric sunshade of embodiments six through nine can be understood with reference to FIG. 27 which shows the unfolded sunshade 200 of FIG. 20 being worn by a person 295. A portion of the unfolded sunshade located between the first edge 204 of the sunshade and the opening 212 extends across the forehead of a person or the front of a cap being worn by a person with the wearer's head protruding through the opening and the sunshade draped over the sides and back of the wearer's head and neck to provide protection from sunlight.

While fabric sunshades according to any of the disclosed embodiments may be marketed as individual items, it is contemplated that a kit may be marketed comprising a pair of glasses, such as glasses with tinted lenses often called sunglasses, and a cloth sunshade that may be readily assembled with and separated from the glasses. This ease of attachment to and separation from glasses is an important advantage of the present invention because a person may wish to wear the same glasses for instance while driving an enclosed vehicle, then with a cloth sunshade when outside the vehicle and exposed to sunlight.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall there between.

What is claimed is:

1. A sunshade comprising a piece of fabric, the sunshade having a first edge, an opposed second edge, and third and fourth edges that each extend between the first edge and the second edge, the sunshade having an opening therein that is completely surrounded by the piece of fabric and is disposed nearer to the first edge than the second edge, the piece of fabric being symmetrical about an axis of symmetry that extends from the first edge to the second edge and passes through the opening, and in close proximity to each of the third and fourth edges the sunshade is provided with a fastening system comprising fastening devices each of the fastening devices that is nearest the third edge being complementary to and axially aligned with one of the fastening devices that is nearest the fourth edge allowing the fastening devices nearest the third edge to engage the axially aligned fastening devices nearest the fourth edge to fasten a first portion of the sunshade to a second portion of the sunshade when the sunshade is folded over on itself in a direction perpendicular to the axis of symmetry.

2. The sunshade of claim 1 wherein the fabric is a stretch fabric.

3. The sunshade of claim 2 wherein the fastening devices are selected from a group of fastening devices consisting of: snaps; patches of hook and loop material; buttons and buttonholes; and magnetic members and ferrous members.

4. The sunshade of claim 2 wherein the fastening devices comprise: a first male snap and a first female snap located in close proximity to one of the third and fourth edges of the sunshade, the first male snap being located closer to the first edge of the sunshade than the first female snap; and a second male snap and a second female snap located in close proximity to the other of the third and fourth edges of the sunshade, the second female snap being located closer to the first edge of the sunshade than the second male snap.

5. The sunshade of claim 2 wherein the fastening devices comprise: a first patch of hook material and a first patch of loop material located in close proximity to one of the third and fourth edges of the sunshade, the first patch of hook material being located closer to the first edge of the sunshade than the first patch of loop material; and a second patch of hook material and a second patch of loop material located in close proximity to the other of the third and fourth edges of the sunshade, the second patch of loop material being located closer to the first edge of the sunshade than the second patch of hook material.

6. The sunshade of claim 2 wherein the fastening devices comprise: a first button and a first buttonhole located in close proximity to one of the third and fourth edges of the sunshade, the first button being located closer to the first edge of the sunshade than the first buttonhole; and a second button and a second buttonhole located in close proximity to the other of the third and fourth edges of the sunshade, the second buttonhole being located closer to the first edge of the sunshade than the second button.

7. The sunshade of claim 2 wherein the fastening devices comprise: a first magnetic member and a first ferrous member located in close proximity to one of the third and fourth edges of the sunshade, the first magnetic member being located closer to the first edge of the sunshade than the first ferrous member; and a second magnetic member and a second ferrous member located in close proximity to the other of the third and fourth edges of the sunshade, the second ferrous member being located closer to the first edge of the sunshade than the second magnetic member.

8. The sunshade of claim 1 wherein the fastening devices are selected from a group of fastening devices consisting of: snaps; patches of hook and loop material; buttons and buttonholes; and magnetic members and ferrous members.

9. The sunshade of claim 1 wherein the fastening devices comprise: a first male snap and a first female snap located in close proximity to one of the third and fourth edges of the sunshade, the first male snap being located closer to the first edge of the sunshade than the first female snap; and a second male snap and a second female snap located in close proximity to the other of the third and fourth edges of the sunshade, the second female snap being located closer to the first edge of the sunshade than the second male snap.

10. The sunshade of claim 9 wherein the fastening devices further comprise a third male snap located in close proximity to one of the third and fourth edges of the sunshade and a third female snap located in close proximity to the other of the third and fourth edges of the sunshade, the third male snap and the third female snap being located closer to the second edge of the sunshade than the second male snap and the first female snap.

11. The sunshade of claim 1 wherein the fastening devices comprise: a first patch of hook material and a first patch of loop material located in close proximity to one of the third and fourth edges of the sunshade, the first patch of hook material being located closer to the first edge of the sunshade than the first patch of loop material; and a second patch of hook material and a second patch of loop material located in close proximity to the other of the third and fourth edges of the sunshade, the second patch of loop material being located closer to the first edge of the sunshade than the second patch of hook material.

12. The sunshade of claim 11 wherein the fastening devices further comprise a third patch of hook material located in close proximity to one of the third and fourth edges of the sunshade and a third patch of loop material located in close proximity to the other of the third and fourth edges of the sunshade, the third patch of hook material and the third patch of loop material being located closer to the second edge of the sunshade than the second patch of hook material and the first patch of loop material.

13. The sunshade of claim 1 wherein the fastening devices comprise: a first button and a first buttonhole located in close proximity to one of the third and fourth edges of the sunshade, the first button being located closer to the first edge of the sunshade than the first buttonhole; and a second button and a second buttonhole located in close proximity to the other of the third and fourth edges of the sunshade, the second buttonhole being located closer to the first edge of the sunshade than the second button.

14. The sunshade of claim 13 wherein the fastening devices further comprise a third button located in close proximity to one of the third and fourth edges of the sunshade and a third buttonhole located in close proximity to the other of the third and fourth edges of the sunshade, the third button and the third buttonhole being located closer to the second edge of the sunshade than the second button and the first buttonhole.

15. The sunshade of claim 1 wherein the fastening devices comprise: a first magnetic member and a first ferrous member located in close proximity to one of the third and fourth edges of the sunshade, the first magnetic member being located closer to the first edge of the sunshade than the first ferrous member; and a second magnetic member and a second ferrous member located in close proximity to the other of the third and fourth edges of the sunshade, the second ferrous member being located closer to the first edge of the sunshade than the second magnetic member.

16. The sunshade of claim 15 wherein the fastening devices further comprise a third magnetic member located in close proximity to one of the third and fourth edges of the sunshade and a third ferrous member located in close proximity to the other of the third and fourth edges of the sunshade, the third magnetic member and the third ferrous member being located closer to the second edge of the sunshade than the second magnetic member and the first ferrous member.

17. A sunshade comprising a piece of fabric, the sunshade having a first edge, an opposed second edge, and third and fourth edges that each extend between the first edge and the second edge, the sunshade having an opening therein that is completely surrounded by the piece of fabric and is disposed nearer to the first edge than the second edge, the piece of fabric being symmetrical about an axis of symmetry that extends from the first edge to the second edge and passes through the opening;

a first male snap and a first female snap are located in close proximity to one of the third and fourth edges of the sunshade, the first male snap being located closer to the first edge of the sunshade than the first female snap; and a second male snap and a second female snap are located in close proximity to the other of the third and fourth edges of the sunshade, the second female snap being located closer to the first edge of the sunshade than the second male snap, the male and female snaps being axially aligned with one another with respect to the axis of symmetry; and a third male snap is located in close proximity to one of the third and fourth edges of the sunshade and a third female snap is located in close proximity to the other of the third and fourth edges of the sunshade, the third male snap and the third female snap being located closer to the second edge of the sunshade than the second male snap and the first female snap and the third male snap and the third female snap are axially aligned with one another with respect to the axis of symmetry.

18. The sunshade of claim 17 wherein the fabric is a stretch fabric.

19. A sunshade comprising a piece of fabric, the sunshade having a first edge, an opposed second edge, and third and fourth edges that each extend between the first edge and the second edge, the sunshade having an opening therein that is completely surrounded by the piece of fabric and is disposed nearer to the first edge than the second edge, the piece of fabric being symmetrical about an axis of symmetry that extends from the first edge to the second edge and passes through the opening;

a first patch of hook material and a first patch of loop material are located in close proximity to one of the third and fourth edges of the sunshade, the first patch of hook material being located closer to the first edge of the sunshade than the first patch of loop material; and a second patch of hook material and a second patch of loop material are located in close proximity to the other of the third and fourth edges of the sunshade, the second patch of loop material being located closer to the first edge of the sunshade than the second patch of hook material, the patches of hook material and the patches of loop material being axially aligned with one another with respect to the axis of symmetry; and a third patch of hook material is located in close proximity to one of the third and fourth edges of the sunshade and a third patch of loop material is located in close proximity to the other of the third and fourth edges of the sunshade, the third patch of hook material and the third patch of loop material being located closer to the second edge of the sunshade than the second patch of hook material and the first patch of loop material and the third patch of hook material and the third patch of loop material are axially aligned with one another with respect to the axis of symmetry.

20. The sunshade of claim 19 wherein the fabric is a stretch fabric.

* * * * *